(12) United States Patent
Dalvi et al.

(10) Patent No.: US 7,363,299 B2
(45) Date of Patent: Apr. 22, 2008

(54) COMPUTING PROBABILISTIC ANSWERS TO QUERIES

(75) Inventors: Nilesh Dalvi, Seattle, WA (US); Dan Suciu, Seattle, WA (US)

(73) Assignee: University of Washington, Seattle, WA (US)

(*) Notice: Subject to any disclaimer, the term of this patent is extended or adjusted under 35 U.S.C. 154(b) by 221 days.

(21) Appl. No.: 11/281,983

(22) Filed: Nov. 17, 2005

(65) Prior Publication Data
US 2006/0206477 A1    Sep. 14, 2006

Related U.S. Application Data

(60) Provisional application No. 60/629,142, filed on Nov. 18, 2004.

(51) Int. Cl.
*G06F 17/30* (2006.01)

(52) U.S. Cl. .......................................... 707/3; 707/100

(58) Field of Classification Search ................ 707/3, 707/100
See application file for complete search history.

(56) References Cited

U.S. PATENT DOCUMENTS

| | | | |
|---|---|---|---|
| 6,886,010 B2 * | 4/2005 | Kostoff | 707/3 |
| 7,058,638 B2 * | 6/2006 | Singh | 707/100 |
| 7,120,623 B2 * | 10/2006 | Ganesan et al. | 707/2 |
| 7,269,598 B2 * | 9/2007 | Marchisio | 707/102 |
| 2001/0013035 A1 * | 8/2001 | Cohen | 707/5 |
| 2003/0046278 A1 * | 3/2003 | McConaghy | 707/3 |
| 2005/0028134 A1 * | 2/2005 | Zane et al. | 717/106 |
| 2005/0222965 A1 * | 10/2005 | Chaudhuri et al. | 707/1 |

OTHER PUBLICATIONS

Zhao, Wenzhong et al., "Databases for interval probabilities," International Journal of Intelligent Systems, 19(9), pp. 789-815, Sep. 2004, © 2004 Wiley Pedodicals, Inc.*

* cited by examiner

*Primary Examiner*—Mohammad Ali
*Assistant Examiner*—Michelle Owyang
(74) *Attorney, Agent, or Firm*—Ronald M. Anderson

(57) ABSTRACT

A system that supports arbitrarily complex SQL queries with "uncertain" predicates. The query semantics are based on a probabilistic model and the results are ranked, much like in Information Retrieval, based upon their probability. An optimization algorithm is employed that can efficiently compute most queries. The algorithm attempts to determine whether a proposed plan is a safe plan that can be used for correctly evaluating the query. Operators such as the project operator in the proposed plan are evaluated to determine if they are safe. If so, the proposed plan is safe and will produce correct answers in a result. Due to the data complexity of some queries, a safe plan may not exist for a query. For these queries, either a "least unsafe plan," or a Monte-Carlo simulation algorithm can be employed to produce a result with answers that have an acceptable error.

27 Claims, 10 Drawing Sheets

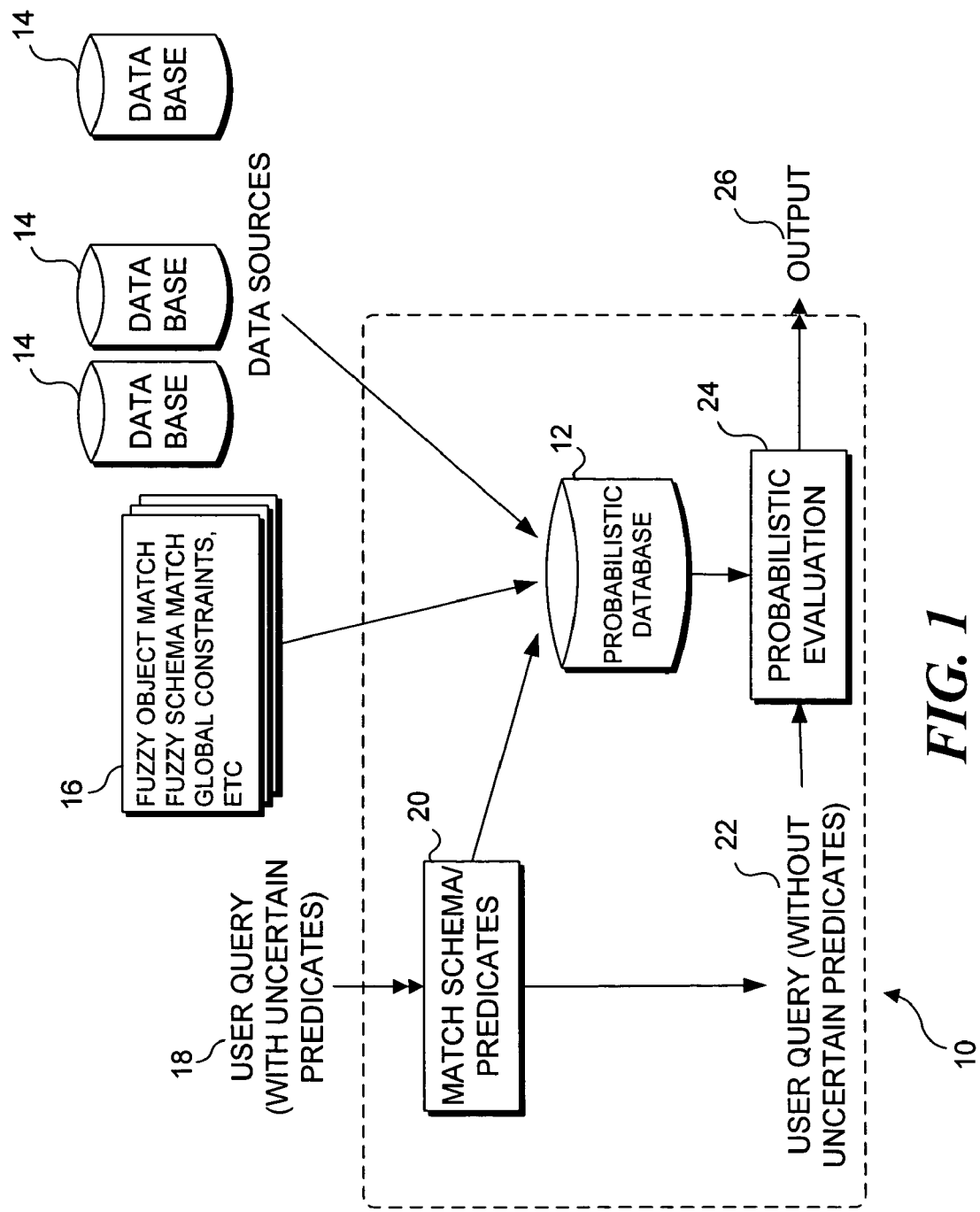

$$S^p = \overbrace{\begin{array}{|c|c|} \hline A & B \\ \hline \text{'m'} & 1 \\ \text{'n'} & 1 \\ \hline \end{array}}^{30} \begin{array}{l} \\ 0.8 \\ 0.5 \end{array} \qquad T^p = \overbrace{\begin{array}{|c|c|} \hline C & D \\ \hline 1 & \text{'p'} \\ \hline \end{array}}^{32} \; 0.6$$
$$\phantom{S^p =} s_1 \phantom{xxx} s_2 \phantom{xxxxxxxxxxxx} t_1$$

FIG. 2A

$$pwd(D^p) = \overbrace{\begin{array}{|l|c|} \hline \text{database instance} & \text{probability} \\ \hline D_1 = \{s_1, s_2, t_1\} & 0.24 \\ D_2 = \{s_1, t_1\} & 0.24 \\ D_3 = \{s_2, t_1\} & 0.06 \\ D_4 = \{t_1\} & 0.06 \\ D_5 = \{s_1, s_2\} & 0.16 \\ D_6 = \{s_1\} & 0.16 \\ D_7 = \{s_2\} & 0.04 \\ D_8 = \phi & 0.04 \\ \hline \end{array}}^{36 \phantom{xxxxxxxxx} 38}$$

$$q^{pwd}(D^p) = \begin{array}{|c|c|} \hline \text{answer} & \text{probability} \\ \hline \{'p'\} & 0.54 \\ \emptyset & 0.46 \\ \hline \end{array} \; 42$$

| A | B | C | D |
|---|---|---|---|
| 'm' | 1 | 1 | 'p' |
| 'n' | 1 | 1 | 'p' | prob
$0.8*0.6 = 0.48$
$0.5*0.6 = 0.30$

50

FIG. 3A    $S^p \bowtie_{B=C} T^p$    (WRONG ANSWER!!)

| D |
|---|
| 'p' | prob
$(1 - (1 - 0.48)(1 - 0.3)) = 0.636$

52

FIG. 3B    $\Pi_D(S^p \bowtie_{B=C} T^p)$

| B |
|---|
| 1 | prob
$(1 - (1 - 0.8)(1 - 0.5)) = 0.9$

| B | C | D |
|---|---|---|
| 1 | 1 | 'p' | prob
$0.9 * 0.6 = 0.54$

62

FIG. 4B    $\Pi_B(S^p) \bowtie_{B=C} T^p$

| D |
|---|
| 'p' | prob
$0.54$

64

FIG. 4C    $\Pi_D(\Pi_B(S^p) \bowtie_{B=C} T^p)$

| A | B | C | D | E |
|---|---|---|---|---|
| 'm' | 1 | 1 | 'p' | $s_1 \wedge t_1$ |
| 'n' | 1 | 1 | 'p' | $s_2 \wedge t_1$ |

FIG. 5A $\quad S^p \bowtie^i_{B=C} T^p$

| D | E |
|---|---|
| 'p' | $(s_1 \wedge t_1) \vee (s_2 \wedge t_1)$ |

FIG. 5B $\quad \Pi^i_D(S^p \bowtie^i_{B=C} T^p)$

| D | Rank |
|---|---|
| 'p' | $Pr((s_1 \wedge t_1) \vee (s_2 \wedge t_1)) = 0.54$ |

(c) $q^{rank}(D^p) = Pr(\Pi^i_D(S^p \bowtie^i_{B=C} T^p))$

ERRORS ON SAFE TPC QUERIES

COMPUTING PROBABILISTIC ANSWERS TO QUERIES

RELATED APPLICATIONS

This application is based on a prior copending provisional application, Ser. No. 60/629,142, filed on Nov. 18, 2004, the benefit of the filing date of which is hereby claimed under 35 U.S.C. § 119(e).

GOVERNMENT RIGHTS

This invention was funded at least in part with a grant (No. IIS-0140493) from the NSF, and the U.S. government may have certain rights in this invention.

BACKGROUND

Databases and Information Retrieval have taken two philosophically different approaches to queries. In databases, SQL queries have a rich structure and precise semantics, which makes it possible for users to formulate complex queries and for systems to apply complex optimizations. Yet, users need to have a relatively detailed knowledge of the database in order to formulate queries. For example, a single misspelling of a constant in the WHERE clause of a query results in an empty set of answers, frustrating casual users. By contrast, a query in Information Retrieval (IR) is just a set of keywords and is easy for casual users to formulate. IR queries offer two important features that are missing in databases: the results are ranked, and the matches may be uncertain, i.e., the answer may include documents that do not match all the keywords in the query. While several proposals exist for extending SQL with uncertain matches and ranked results, they are either restricted to a single table, or, when they handle join queries, adopt ad-hoc semantics.

To illustrate the point, consider the following structurally rich query, asking for an actor whose name is like "Kevin" and whose first "successful" movie appeared in 1995:

```
SELECT      A.name
FROM        Actor A, Film F, Casts C
WHERE       C.filmid = F.filmid
   and      C.actorid = A.actorid
   and      A.name ≈ "Kevin"
   and      F.year ≈ 1995
   and      F.rating ≈ "high"
            SELECT     MIN(F.year)
            FROM       Film F, Casts C
            WHERE      C.filmid = F.filmid
                       and C.actorid = A.actorid
                       and F.rating ≈ "high"
```

The three ≈ operators indicate the predicates are intended as uncertain matches. Techniques like edit distances, ontology-based distances, IDF-similarity, and QF-similarity can be applied to a single table, to rank all Actor tuples (according to how well they match the first uncertain predicate), and to rank all Film tuples. But, it is unclear how to rank the entire query, which is considered complex because it includes a nested query (i.e., the second section wherein a result must be selected in regard to the film year. To date, no system combines structurally rich SQL queries with uncertain predicates and ranked results. No conventional approach is able to effectively determine accurate probability results for queries that include joins, nested sub queries, aggregates, group-by, and existential/universal quantifiers.

This problem has been addressed in the past by employing a database in which each tuple has an associated probability, which represents the probability that the tuple actually belongs to the database. Examples of probabilistic relational databases are shown below. However, the results using such databases with the conventional approach are often incorrect, as demonstrated below. When queries are evaluated over a probabilistic database, the system should preferably compute a traditional query answer, as well as a probability for each tuple in the answer. The answer tuples might then be sorted according to this latter probability, and presented to the user. Users would then be able to inspect the top results returned, e.g., up to 20-40 answers, which should represent the most relevant answers to the query.

Adding probabilities to relational databases is known in the prior art. However, the prior art does not explain how probabilities added to a database can be made applicable to a wide range of applications, such as queries with uncertain predicates, queries over two databases for which there are fuzzy object matches, and queries over integrated data that violate some global constraints and do not provide an efficient approach to computing probabilistic answers to queries.

SUMMARY

One aspect of this novel approach is thus directed to a method for evaluating a query of data in a probabilistic database, in which elements of the data are associated with probabilities between zero and one. In an exemplary method, the query is defined using structured query language (SQL). The query returns a result for each answer of the result, indicating a relative likelihood that the answer satisfies the query. The method includes the step of determining if a proposed plan for evaluating the query includes any unsafe operator that may cause an incorrect result. If so, it may be possible to split the query into two sub-queries so that evaluation of a join of the two sub-queries will return a correct result for the query. If the proposed plan for evaluating the query does not include an unsafe operator, the proposed plan, which is a safe plan, is used to evaluate the query, producing the result. However, if the proposed plan includes an unsafe operator, and the query can be split into the two sub-queries so that evaluation of the join of the two sub-queries will return a correct result for the query, the proposed plan is still a safe plan; evaluating the join of the two sub-queries can then be employed to produce the result. In some complex queries, the proposed plan for evaluating the query includes an unsafe operator, but the query cannot be split into the two sub-queries that will return a correct result for the query. In the latter event, an alternative plan is selected for evaluating the query. This alternative plan thus produces a result with an acceptable error in the relative probabilities. In any case, the result is presented to a user as the last step of the method.

In one exemplary embodiment, each row of the data in the probabilistic database comprises an element of the data. And, each row is associated with a probability between zero and one, inclusive.

To determine if the query can be split into two sub-queries so that evaluation of a join of the two sub-queries will return a correct result for the query includes constructing a graph having nodes that are relations in the query, and an edge ($R_i$, $R_j$), such that the query includes a join condition $R_i.A=R_j.B$, with both $R_i.A$ and $R_j.B$ included in head attributes for the query. The method then determines if the graph is connected. If so, the query cannot be split into sub-queries to produce the correct result by evaluating the join of the sub-queries. Further, if the graph is connected, a least unsafe plan can be selected so that evaluation of the query produces a result with a minimum error in the probabilities for each of the answers. To select the least unsafe plan, a project operator that removes attributes in the join condition is identified for each edge in the graph. Next, a weight of the edge (where the weight of the edge corresponds to a degree of unsafety of the edge) is determined. Finally, a minimum cut of the graph is identified that results in two sub-queries having the lowest sum for the weight of edges crossing the two sub-queries in the graph. The two sub-queries are then employed in the alternative plan for evaluating the query.

If the graph is not connected, the exemplary method also includes the step of partitioning the graph into the two sub-queries, such that there is no edge across the sub-queries. The join of the two sub-queries is then used to evaluate the query and to return the result for the query.

Another aspect of this new approach is directed to a system for determining a result for a query of data in a probabilistic database. The system includes a store that retains the data in the probabilistic database, a memory that stores machine instructions and data transferred from the store, and a processor. The processor is coupled to the store and to the memory and executes the machine instructions stored in the memory to carry out a plurality of functions that are generally consistent in functionality to the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

BRIEF DESCRIPTION OF THE DRAWING FIGURES

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a block diagram of the functional system architecture used in the present novel technology;

FIG. 2A (prior art) is an illustration of a simple, exemplary probabilistic database, $D^P$, while FIGS. 2B, 2C, and 2D respectively illustrate a table showing "the possible worlds" for the probabilistic database of FIG. 2A, a query based on that database, and the possible results for the query;

FIGS. 3A and 3B illustrate an exemplary evaluation of the query of FIG. 2D, for a plan that is often used in the conventional approach, but which provides erroneous results;

FIGS. 4A-4C illustrate the evaluation of an alternative plan for obtaining the correct results for the query in FIG. 2D;

FIGS. 5A-5C illustrate the intensional evaluation of the query in FIG. 2D;

FIG. 6 is a graph illustrating running times for ten TPC-H queries, when using a "safe plan," an optimized query, and a bare query;

DESCRIPTION

Figures 5C, 6:
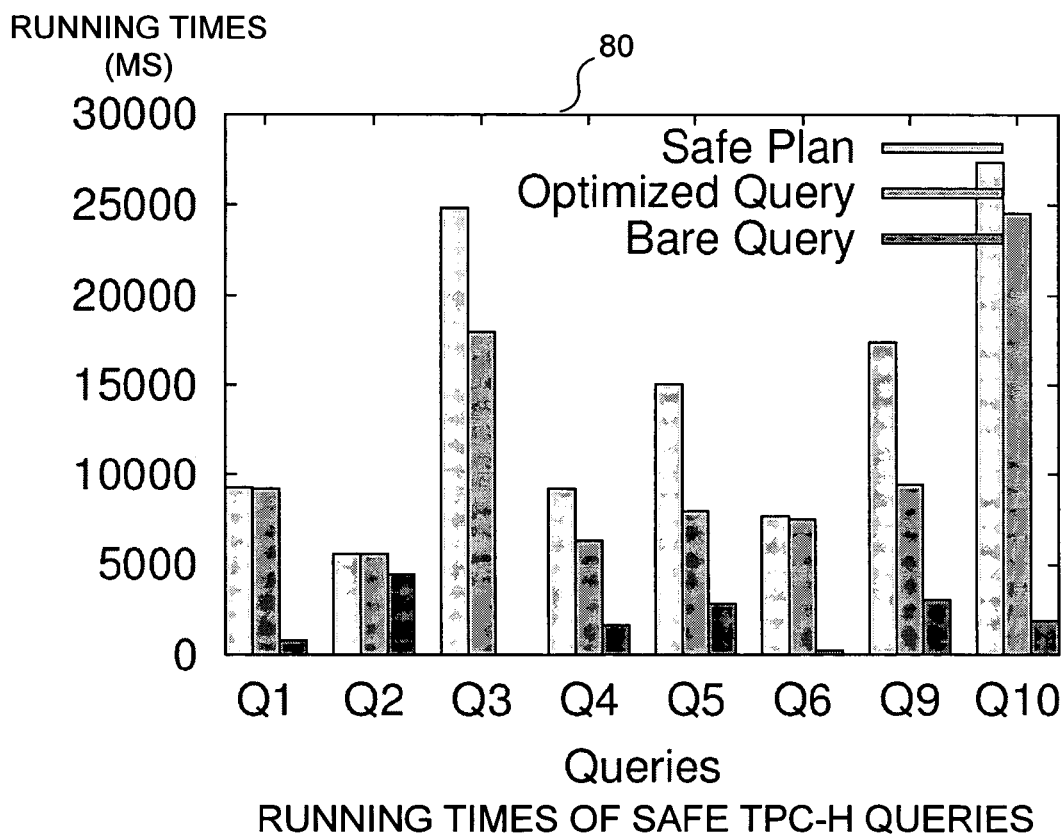

Figures and Disclosed Embodiments are not Limiting

Exemplary embodiments are illustrated in referenced Figures of the drawings. It is intended that the embodiments and Figures disclosed herein are to be considered illustrative rather than restrictive.

Exemplary Systems Diagram

An exemplary systems diagram 10 that illustrates functional components for carrying out the present invention is shown in FIG. 1. A probabilistic database 12 is provided that associates a probability for each tuple in the database. The actual data included in probabilistic database 12 are drawn from one or more database sources 14. The probabilities for each tuple in the probabilistic database are derived from conditions 16, which include global constraints, statistics, and domain knowledge related to the data. For each user query, the system outputs a ranked list of answers based on a probabilistic score. There are two main components to the system: generation of probabilistic database 12 and evaluation of a user query 18. The user query is processed to match the schema and predicates, as indicated in a block 20, and the output of this step is applied to probabilistic database 12 and formulated as a deterministic query 22, which is processed to carry out a probabilistic evaluation 24 of the query on the probabilistic database. The result is then provided as an output 26 that includes a probability for each answer in the result.

Explicit Occurrences of Probabilities

Approximate Matches: When querying an unfamiliar data source, users often do not know how to formulate the selection predicates in a query. Predicates that compute approximate matches can be used in such cases. In the exemplary query presented above in the Background section, the user is looking for a movie made around 1995, starring an actor whose name is close to "Kevin," and with a high rating.

The following discussion uses a datalog notation instead of SQL. The above query becomes:

$q_1$(name):—Actor(actorid, name),
  Casts(actorid, filmid),
  Film(filmid, title, year, rating)
  name≈"Kevin," year≈1995,
  rating≈"high"

Techniques for approximate match predicates (denoted ≈ in the query) include edit distances, ontology-based distances, IDF-similarity and QF-similarity and lexicons like Wordnet. Given two data values, an approximate match predicate returns a score indicating how well the two values match, and these scores can be used as input by the query processor. However, the major challenge is how to compute an output rank for each answer, from these input scores. In the case of a single-table query where several approximate match predicates are computed on each record in the table, one may come up with ad-hoc combination functions, e.g., taking the weighted sum of the input scores. But in the case of a multi-table join query like $q_1$, it is unclear how to combine the various input scores. For example, the system may need to decide whether to rank an actor with a good match to "Kevin," but who made only one movie in 1991, relative to an actor with a poorer match to "Kevin," but who acted in movies in 1994 and 1995, and in two movies in 1996. Probabilistic databases offer a principled approach to computing an output score from the input scores. The scores on the input tuples are first converted into probabilities, then the query is evaluated on a probabilistic database. For example, denoting $p_{name}(a)$ the probability that an actor record approximately matches≈"Kevin," and $p_{year}(f)$, $p_{rating}(f)$ the respective probabilities for a movie record f, then the output probability of an answer indicating an actor a is:

$$p_{name}(a) \cdot \left(1 - \prod_f (1 - p_{year}(f) \cdot p_{rating}(f))\right)$$

where f ranges over all movies of actor a.

It should be understood that probabilistic databases do not per se solve the score combination problem, but instead, simply reduce it to the problem of converting the input scores into meaningful probabilities, which is non-trivial and is specific to a particular match algorithm. The conversion problem is not addressed herein.

Fuzzy object matches: When a system has to combine information from multiple sources, differences in data representation lead to the identity matching problem, wherein the same object may have totally different names in different data sources. For instance, different sources refer to the same person by "John Doe," "Doe, John," "J. Doe," and so forth. The matching can be done automatically or manually, in which case the correspondence between values is stored in a mapping table. However, in order to avoid false positives, likely but not certain matches are not retained and cannot be used by a query processor, which often prevents a user from finding relevant answers and sometimes even prevents finding any answers at all. To illustrate with a simple example, consider two data sources about films wherein $F_1(T,A)$ has information about movie titles T and actors A, and $F_2(T,D)$ has data about movie titles T and their director D. Suppose that a match engine or a domain specialist constructs a mapping table $M(T_1, T_2)$ with pairs of movie titles from $F_1$ and $F_2$ that represent the same movie. The mapping can be used in queries that span both sources, like in the following query that finds all actors who worked with a common director and with the actor being like "Kevin." The query might read as follows:

$q_2(A)$:—$F_1(T_1,A), M(T_1, T_2), F_2(T_2, D)$,
$F_1(T'_1, \text{"Kevin"}), M(T'_1, T'_2), F_2(T'_2, D)$ The problem is that in practice only the certain matches are stored in M. Likely, but uncertain correspondences are readily available, but they are not stored in M, because there is no way for the query processor to use them and indicate to the user that it used uncertain information when computing the answer, which is possible, however, using a probabilistic framework. The map table becomes $M(T_1, p, T_2)$, saying that the titles $T_1$ and $T_2$ match with some probability p. Queries like $q_2$ are now evaluated using probabilistic semantics, and their answers are associated with a probability and ranked.

Probabilistic Schema Matching: Automated or semi-automated schema matching algorithms have been an active area of research, and several quite effective schema matching systems have been developed recently. As with data matchers, a schema matching algorithm often rejects very good correspondences in order to return a certain match. Consider the following simple example, consisting of two sources $S_1$ and $S_2$, with the following schemas:

$S_1$(personName, officeAddress, homeAddress)
$S_2$(name, addr)

An automatic schema matcher will map personName to name, but will need to choose whether to map officeAddress or homeAddress to addr. Clearly, this result is a tie. Some advanced schema matching algorithms will look beyond the schema and inspect the data items at the two sources, and inspect their similarity. In this example, suppose that the algorithm decides that values in $S_2$ addr are much closer to those in $S_1$.officeAddress than to $S_1$.homeAddress. In this case, the algorithm will generate the following mapping:

M: personName→name
officeAddress→addr

This correspondence is next converted into a data transformation expression from $S_1$ to $S_2$. The transformation maps a tuple $(n, a_1, a_2) \in S_1$ to the tuple $(n, a_1) \in S_2$. The transformation is used by a query processor to translate queries and/or data between the sources. Notice that, due to the choice the schema matching algorithm had to make, any semantic connection between homeAddress and addr is lost. An alternative for the matching algorithm is to map addr to the union of officeAddress and homeAddress. The mapping becomes:

M: personName→name
officeAddress∪homeAddress→addr

Now, the corresponding transformation will map a tuple $(n, a_1, a_2)$ in $S_1$ to two tuples $(n, a_1)$ and $(n, a_2)$ in $S_2$. But using this approach, the evidence that addr is more likely to match officeAddr than homeAddr is lost. It is thus proposed to use a probabilistic framework to capture both possibilities. In this framework, both officeAddress and homeAddress map to addr, but with different probabilities. The mapping might be expressed as:

| M: | personName → name | $p_1 = 1.0$ |
|---|---|---|
| | officeAddress → addr | $p_2 = 0.85$ |
| | homeAddress → addr | $p_3 = 0.15$ |

The corresponding data transformation maps a tuple $(n, a_1, a_2)$ in $S_1$ into two probabilistic tuples in $S_2$: $(n, a_1)$ with probability 0.85, and $(n, a_2)$ with probability 0.15. A query expressed over the schema $S_2$ can now be evaluated as a query over a probabilistic database, since the schema $S_2$ is virtually populated with probabilistic tuples obtained from $S_1$.

Handling Inconsistencies: Sometimes certain integrity constraints are believed to be determinative in the global system. For instance, every person has a unique address, and every paper is published in a unique conference. Unfortunately these global constraints are often violated due to inconsistencies in data sources. Even in the presence of consistent data sources, a global system that integrates global constraints may become inconsistent. A taxpayer database and a voter registration database may have conflicting addresses for the same person. Each of those databases separately satisfies the functional dependency that associates a single address with each person, and yet together, they violate this dependency. When presented with the evidence of a constraint violation, a system should decrease, but not eliminate tuples whose answer depends on conflicting evidence. To illustrate, consider two data sources $S_1$(name, city, email) and $S_2$(name, city, employer), and suppose that the user wants to find the email address of "John Smith." Clearly, this can be answered only from $S_1$: assuming $S_1$ contains the tuple ("John Smith," "Seattle," "js@seattle.com"), then the answer should include "js@seattle.com." But now assume there is a global constraint that each person live in only one city, and that the tuple ("John Smith," "Portland," "Intel") is also found in $S_2$. Now, a violation of the global constraint exists, and it is necessary to re-examine the result that should be returned to the user.

Current approaches to answering queries in inconsistent databases are based on the concept of a repair. They consider all minimal ways of repairing the database to restore its consistency. In the example provided above, these approaches eliminate both tuples (since there is no canonical choice between them), resulting in an empty answer to the query. One can modify these algorithms and pick only one tuple to be eliminated, and the result returned by the query will depend on the tuple that is chosen for elimination. This solution is not satisfactory either, since it arbitrarily chooses to trust one source and ignore the other. Preferably, probabilities are used to address this issue. It is assumed that both sources $S_1$ and $S_2$ are probabilistic sources, and therefore, the two tuples will have some (yet unknown) probabilities $p_1$ and $p_2$ of belonging to $S_1$ and $S_2$, respectively. Since together, the tuples violate the constraint, the system will conclude that the two tuples are disjoint probabilistic events (negatively correlated); specifically, this condition results when $p_1+p_2 \leq 1$. Lacking any other evidence, the system may assume that p1=p2=0.5 (which can be altered in view of other evidence) and will return the answer "js@(seattle.com" with a probability of 0.5. This result will likely rank it much lower than other answers that are obtained from non-conflicting evidence, but will neither hide the answer from the user, nor ignore the conflict.

Approaches for Evaluating Queries on Probabilistic Databases

The present approach evaluates a structured query language (SQL) query by initially assigning a probability to each tuple in the input database according to the knowledge about that tuple (how well it matches the uncertain predicates; how similar two objects are; how well two schema elements match; etc.), and then, by evaluating the SQL query over the probabilistic database. A probability is derived for each tuple in the answer, and this probability determines the output ranking.

An important characteristic of this approach is that any SQL query has a meaning, including queries with joins, nested sub-queries, aggregates, group-by, and existential/universal quantifiers. Queries can thus now have a probabilistic semantic character, which is simple and easy to understand by both users and implementers.

The main problem is query evaluation, and this problem is the focus of the following discussion. The present approach is to represent SQL queries in an algebra format, and modify the operators to compute the probabilities of each output tuple. This approach is called extensional semantics and is quite efficient.

While this approach sounds simple, the problem is that, taken alone, it often doesn't work correctly. Instead, the probabilities computed this way are wrong in most cases, and lead to incorrect ranking. One workaround suggested in the prior art is to use an intensional semantics technique, which is much more complex and, as shown below, is generally impractical. The novel approach explained below is different. It involves rewriting the query plans, searching for one where the extensional evaluation is correct. The following discussion shows that certain queries have a #P-complete data complexity under probabilistic semantics, and hence do not admit a correct extensional plan. While they are not frequent in practice (for example, only two out of the ten TPC/H queries fall in this category, and only when all their predicates are uncertain), two techniques are described below to address them. Specifically, queries for which a correct extensional plan cannot be developed can be addressed either by: (1) using heuristics to chose a plan that avoids large errors (i.e., by choosing a plan that minimizes the errors); or (2) by using a Monte-Carlo simulation algorithm, which is more expensive but can guarantee arbitrarily small errors.

Examples Illustrating the Main Concepts and Techniques

In a probabilistic database each tuple has a certain probability of belonging to the database. FIG. 2A shows a probabilistic database $D^p$ with two tables, $S^p$ and $T^p$ indicated by reference numerals 30 and 32, respectively. The tuples $s_1$ and $s_2$ in $S^p$ have probabilities 0.8 and 0.5, respectively, and a unique tuple, $t_1$, in $T^p$ has a probability 0.6. The superscript, $^p$, is used to emphasize that a table or a database is probabilistic. It is assumed in this example that the tuples are independent probabilistic events, in which case, the database is called extensional.

The meaning of a probabilistic database is a probability distribution on all database instances, which is referred to as "possible worlds" and denoted by pwd($D^p$). FIG. 2B includes a table 34 that shows the eight possible instances 36, with non-zero probabilities 38, which are computed by simply multiplying the tuple probabilities, since they are assumed that to be independent. For example, the probability of $D_2$ is 0.8*(1−0.5)*0.6=0.24, since the instance contains the tuples $s_1$ and $t_1$ and does not contain the tuple $s^2$.

A query evaluation on probabilistic databases will now be illustrated. Consider the conjunctive query q(u) in FIG. 2C. Its meaning on $D^p$ is a set of possible answers 40, shown in FIG. 2D, with their corresponding probabilities 42. The query is obtained by applying q to each deterministic database in pwd($D^p$), and adding the probabilities of all instances that return the same answer. In this example, $q(D_1)=q(D_2)=q(D_3)=\{'p'\}$, and $q(D_4)=\ldots=q(D_8)=0$. Thus, the probability of the answer being $\{'p'\}$ is 0.24+0.24+0.06=0.54, while the probability of the answer being 0 is 0.46. Thus, FIG. 2D defines the set of possible answers, denoted $q^{pwd}(D^p)$.

Notice that the structure of the query was never explicitly used in the above example, but only applied to deterministic queries taken from pwd($D^p$). Thus, one can employ a similar semantics with any query q, no matter how complex, because it is only necessary to know its meaning on deterministic databases.

The set of possible answers $q^{pwd}(D^p)$ may be very large, and impractical to return to the user. Instead, it is preferable to compute for each possible tuple t, a probability rank that t belongs to any answer, and sort tuples by this rank. The rank is denoted by $q^{rank}(D^p)$. See the following example:

$$q^{rank}(D^p) = \begin{array}{|c|c|} \hline D & \text{Rank} \\ \hline \text{`}p\text{'} & 0.54 \\ \hline \end{array}$$

In this simple example, $q^{rank}(D^p)$ contains a single tuple and the distinction between $q^{pwd}$ and $q^{rank}$ is blurred. To see this distinction more clearly, consider another query, $q_1(x)$: $-S^p(x, y), T^p(z, y), y=z$. Here $q^{pwd}$ and $q^{rank}$ are given by:

$$q_1^{pwd}(D^p) = \begin{array}{|c|c|} \hline \text{answer} & \text{probability} \\ \hline \{\text{`}m\text{'}, \text{`}n\text{'}\} & 0.24 \\ \hline \{\text{`}m\text{'}\} & 0.24 \\ \hline \{\text{`}n\text{'}\} & 0.06 \\ \hline 0 & 0.46 \\ \hline \end{array}$$

$$q_1^{rank}(D^p) = \begin{array}{|c|c|} \hline D & \text{Rank} \\ \hline \text{`}m\text{'} & 0.48 \\ \hline \text{`}n\text{'} & 0.30 \\ \hline \end{array}$$

Thus, the rank probability of 'm' in this example is obtained as $\Pr(\{\text{`}m\text{'}, \text{`}n\text{'}\}) + \Pr(\{\text{`}m\text{'}\})$, which equals 0.48, while the rank probability of 'n' is equal to 0.30. In general, $q^{pwd}(D^p)$ may be exponentially large, while $q^{rank}(D^p)$ is simply a set of tuples, which are sorted by rank. The problem is now to compute $q^{rank}(D^p)$ efficiently.

Extensional Query Semantics

A natural approach to compute $q^{rank}(D^p)$ might seem to represent q as a query plan, and then compute the probabilities of all tuples in all intermediate results. For the query q in FIG. 2C, such a plan is $p=\Pi_D(S^p \bowtie_{B=C} T^p)$, and corresponding probabilities 50 and 52 are shown in FIGS. 3A and 3B, respectively. The formulas for the probabilities assume tuple independence and would appear to be rather straightforward. For example, the probability of a joined tuple $s \bowtie t$ would appear to be equal to the product of the probabilities of s and t. Clearly, this approach is much more efficient than computing the possible worlds $q^{pwd}(D^p)$ followed by computing $q^{rank}(D^p)$, but it is wrong! This approach, which seems appropriate, returns an answer with a probability of 0.636, while the probability of the answer should be 0.54. The reason for the incorrect probability is that the two tuples in $S^p \bowtie_{B=C} T^p$ are not independent events, hence the formula used in $\Pi_D$ is wrong.

However, consider an alternative plan, $p'=\Pi_D((\Pi_B(S^p)) \bowtie_{B=D} T^p)$ The extensional evaluation of this expression is shown in components 60, 62, and 64 in FIGS. 4A-4C, and this plan produces the correct probability for the answer, as indicated in component 64 of FIG. 4C. As shown below, this alternative plan will always compute the correct answer to q, on any probabilistic tables $S^p$, $T^p$. The following discussion shows how to automatically find a plan whose extensional evaluation returns the correct probability for each answer to a query q. Finding such a plan requires pushing projections early (as shown in this example), join reordering, and other kinds of rewritings, as discussed below.

Queries with Uncertain Matches

While query evaluation on probabilistic databases is an important problem in itself, the motivation for developing the technique disclosed herein comes from answering SQL queries with uncertain matches, and ranking their results. A simple example on a movie database will illustrate how such queries may be evaluated.

| SELECT | DISTINCT F.title, F.year |
|---|---|
| FROM | Director D, Films F |
| WHERE | D.did = F.did |
| and | D.name ≈ 'Copolla' |
| and | F.title ≈ 'rain man' |
| and | F.year ≈ 1995 |

The predicates on the director name and the movie title and year are here uncertain.

The approach used is to translate the query into a regular query over a probabilistic databases. Each tuple in the table Films is assigned a probability based on how well it matches the predicates title≈"rain man" and year≈1995. Several techniques for doing this exist already and may be used in the present approach. In all cases, the result is a probabilistic table, denoted $Films^p$. Similarly, the uncertain predicate on Director generates a probabilistic table $Director^p$. Then, the following query is evaluated:

| SELECT | DISTINCT F.title, F.year |
|---|---|
| FROM | $Director^p$ D, $Films^p$ F |
| WHERE | D.did = F.did |

This query is similar to the query q considered above in FIG. 2C, and the same extensional plan can be used to evaluate it. The approach used herein returns:

| title | year | Rank |
|---|---|---|
| The Rainmaker (by Coppola) | 1997 | 0.110 |
| The Rain People (by Coppola) | 1969 | 0.089 |
| Rain Man (by Levinson) | 1988 | 0.077 |
| Finian's Rainbow (by Coppola) | 1968 | 0.069 |
| Tucker, Man and Dream (Coppola) | 1989 | 0.061 |
| Rain or Shine (by Capra) | 1931 | 0.059 |
| ... | ... | ... |

Basic Notations

In the following discussion, R represents a relation name, Attr(R) represents its attributes, and $r \subseteq U^k$ indicates a relation instance where k is arity(R) and U is a fixed, finite universe. $\bar{R}=R_1, \ldots, R_n$ is a database schema and D denotes a database instance. (The term "arity" refers to the number of arguments that a function or operator has.) The expression $\Gamma \vDash D$ is used to indicate that D satisfies the functional dependencies in $\Gamma$.

Probabilistic Events

Let AE be a set of symbols and $\Pr: AE \to [0, 1]$ a probability function. Each element of AE is called a basic event, and it is assumed that all basic events are independent. The event $\bot \in AE$ denotes the impossible event and $\Pr(\bot)=0$. A complex event is an expression constructed from atomic events using the operators $\wedge, \vee, \neg$. E denotes the set of all complex events. For each complex event e, let $\Pr(e)$ be its probability.

EXAMPLE 1

Consider $e=(s_1 \wedge t_1) \vee (s_2 \wedge t_1)$, and assume $Pr(s_1)=0.8$, $Pr(s_2)=0.5$, $Pr(t_1)=0.6$. To compute $Pr(e)$, construct the truth table for $e(s_1, s_2, t_1)$ and identify the entries where e is true, namely (1, 0, 1), (0, 1, 1), (1, 1, 1). The three entries have probabilities $Pr(s_1)(1-Pr(s_2))Pr(t_1)=0.8\times0.5 \times0.6=0.24$, $(1-Pr(s_1))Pr(s_2)Pr(t_1)=0.06$ and $Pr(s_1)Pr(s_2)Pr(t_1)=0.24$ respectively. Then $Pr(e)$ is their sum, 0.54.

This method generalizes to any complex event $e(s_1, \ldots, s_k)$, but it is important to note that this algorithm is exponential in k, which cannot be avoided, since it is known that computing $Pr(e)$ is #P-complete even for complex events without negation.

Probabilistic Databases

A probabilistic relation is a relation with a distinguished event attribute E, whose value is a complex event. The superscript p is added to mean "probabilistic," i.e., write $R^p$, $r^p$, $\bar{R}^p$, $\Gamma^p$. Given $R^p$, write R for its "deterministic" part, obtained by removing the event attribute: $Attr(R)=Attr(R^p)-\{E\}$. Users "see" only R, but the system needs to access the event attribute $R^p.E$. The set of functional dependencies $\Gamma^p$ always contains:

$$Attr(R) \to R^p.E$$

for every relation $R^p$, which ensures that two different events, $e_1$ and $e_2$ are not associated to the same tuple t (instead, it may be desirable to associate $e_1 \vee e_2$ to t).

In addition to this tabular representation of a probabilistic relation, consider a functional representation, where a probabilistic instance $r^p$, of type $R^p$, is described by the following function $e_R:U^k \to E$, where k=arity(R). When t occurs in $r^p$ together with some event e, then $e_R(t)=e$, otherwise $e_R(t)=\bot$. Conversely, one can recover $r^p$ from the function $e_R$ by collecting all tuples for which $e_R(t) \neq \bot$.

The input probabilistic databases that are considered have only atomic events: complex events are introduced only by query evaluation. A probabilistic relation with atomic events that $R^p.E \to Attr(R)$ satisfies the FD $R^p.E \to Attr(R)$ is called extensional. Otherwise, it is called intensional. For example, the exemplary database in FIG. 2A is an extensional probabilistic database, where the atomic events are $s_1$, $s_2$, $t_1$ respectively.

Semantics of a Probabilistic Database

A simple and intuitive meaning is given to a probabilistic relation based on possible worlds. The meaning of a probabilistic relation $r^p$ of type $R^p$ is a probability distribution on deterministic relations r of type R, which is referred to herein as the possible worlds and denoted $pwd(r^p)$.

Let $R^p.E \to Attr(R)$ be the functional representation of $r^p$. Given $r \subseteq U^k$, $Pr(r)$ is defined to be $Pr(\wedge_{t \in r} e_R(t)) \wedge (\wedge_{t \notin r} \neg e_R(t))$. Intuitively, this definition is the probability that exactly the tuples in r are "in" and all the others are "out." One can check that $\Sigma_{r \subseteq U^k} Pr(r)=1$. Given a set of functional dependencies $\Gamma^p$, denote $\Gamma$ its projection to the deterministic attributes. If $\Gamma^p \models r^p$, it is desirable for $Pr(r)$ to be a probability distribution on those instances that satisfy r. This condition is the case, because if $\Gamma \not\models r$, then $Pr(r)=0$; hence, $\Sigma_{r \subseteq U^k, \Gamma \models r} Pr(r)=1$.

Similarly, the meaning of a probabilistic database $D^p$ is a probability distribution on all deterministic databases D, denoted $pwd(D^p)$.

Query Semantics

Let q be a query of arity k over a deterministic schema $\bar{R}$. Now, define a very simple and intuitive semantics for the query. Users think of q as normal query on a deterministic database, but the database is given by a probability distribution rather than being fixed. As a result, the query's answer is also a probability distribution. Formally, given a query q and a probabilistic database $D^p$: $q^{pwd}(D^p)$ is the following probability distribution on all possible answers, $$Pr_q: P(U^k) \to [0, 1]: \forall S \subseteq U^k, Pr_q(S) = \sum_{D|q(D)=S} Pr(D)$$

This result is referred to herein as the possible worlds semantics. This definition makes sense for every query q that has a well defined semantics on all deterministic databases.

It is impossible to return $q^{pwd}(D^p)$ to the user. Instead, compute a probabilistic ranking on all tuples $t \in U^k$, defined by the function:

$$rank_q(t) = \Sigma_S \{Pr_q(S) | S \subseteq U^k, t \in S\}.$$

The term $q^{rank}(D^p)$ is a tabular representation of the function $rank_q$, which is a table with k+1 attributes, where the first k represents a tuple in the query's answer, while the last attribute, called Rank is a real number in [0, 1] representing its probability.

The Query Evaluation Problem

The discussion now addresses the following problem. Given the schema $\bar{R}^p$, $\Gamma^p$, a probabilistic database $D^p$ and a query q over schema $\bar{R}$, compute the probabilistic rankings $q^{rank}(D^p)$. This problem has application to queries with uncertain predicates. Consider a deterministic database D and a query $q\approx$ that explicitly mentions some uncertain predicates. This problem is converted into evaluating a query q, obtained by removing all uncertain predicates from $q\approx$, on a probabilistic database, obtained by associating a probability $Pr(t)$ to each tuple t based on how well t satisfies the uncertain predicates in the query.

Query Evaluation

Now turn to the central problem, evaluating $q^{rank}(D^p)$ for a query q, and a probabilistic database $D^p$. Applying the definition directly is infeasible, since it involves iterating over a large set of database instances. Instead, the following discussion will first review the intensional evaluation and then describe an exemplary preferred approach.

First, the discussion is restricted to conjunctive queries, or, equivalently select (distinct)-project-join queries, which should help to better understand the query evaluation problem and its complexity. More complex query expressions are discussed below. Either datalog notation, or plans p in the select/project/product algebra ($\sigma$, $\Pi$, x) will be employed for the queries q.

Intensional Query Evaluation

One method for evaluating queries on probabilistic databases is to use complex events, and the limitations of this approach are discussed below. Start by expressing q as a query plan, using the operators $\sigma$, $\Pi$, x. Then modify each operator to compute the event attribute E in each intermediate result: denote $\sigma^i$, $\Pi^i$, $x^i$ the modified operators. It is more convenient to introduce them in the functional representation, by defining the complex event $e^p(t)$ for each tuple t, inductively on the query plan p:

$$e_{\sigma_c^i(p)}(t) = \begin{cases} e_p(t) & \text{if } c(t) \text{ is true} \\ \perp & \text{if } c(t) \text{ is false} \end{cases}$$

$$e_{\Pi_{\bar{A}}^i(p)}(t) = \bigvee_{t' : \Pi_{\bar{A}}(t')=t} e_p(t')$$

$$e_{p \times^i p'}(t, t') = e_p(t) \wedge e_{p'}(t')$$

The tabular definitions for $\Pi^i$, $x^i$ follow easily: $\sigma^i$ acts like $\sigma$, then copies the complex events from the input tuples to the output tuples; $\Pi^i$ associates to a tuple t the complex event $e_1 \vee \ldots \vee e_n$ obtained from the complex events of all input tuples $t_1, \ldots, t_n$ that project into t; and $x^i$ simply associates to a product tuple (t, t') the complex event $e \wedge e'$.

EXAMPLE 2

Consider the database $D^p$ described in prior art FIG. 2A. Consider the query plan, $p = \Pi_D(S^p \bowtie_{B=C} T^p)$. FIGS. 5A, 5B, and 5C show components 70, 72, and 74 that are used in the intensional evaluation of the query (the tuple names are used as atomic events). $p^i(D^p)$ contains a single tuple 'p' with the event $(s_1 \wedge t_1) \vee (S_2 \wedge t_1)$.

Thus, $p^i(D^p)$ denotes an intensional probabilistic relation. It can be shown that this result is independent of the particular choice of plan p, and $q^i(D^p)$) is denoted as the value $p^i(D^p)$ for any plan p for q, and is referred to herein as the intensional semantics of q on the probabilistic database $D^p$. It will not be proven that it is equivalent to the possible worlds semantics, $q^{pwd}(D^p)$.

Theorem 1: The intensional semantics and the possible worlds semantics on probabilistic databases coincide for conjunctive queries. More precisely, $pwd(q^i(D^p)) = q^{pwd}(D^p)$ for every intensional probabilistic database $D^p$.

This theorem makes it possible to compute $q^{rank}(D^p)$, as follows. First, compute $q^i(D^p)$, then compute the probability Pr(e) for each complex event. Then $q^{rank}(D^p) = Pr(q^i(D^p))$. FIG. 5C shows $p^{rank}(D^p)$ for Example 2. $Pr((s_1 \wedge t_1) \vee (s_2 \wedge t_1))$ was shown in Example 1.

It is very impractical to use the intensional semantics to compute the rank probabilities, for two reasons. First, the event expressions in $q^i(D^p)$ can become very large, due to the projections. In the worst case, the size of such an expression can become of the same order of magnitude as the database, which increases the complexity of the query operators significantly, and makes the task of an optimizer much harder, because now the cost per tuple is no longer constant. Second, for each tuple t, one has to compute Pr(e) for its event e, which is a #P-complete problem.

Extensional Query Evaluation

The query operators are now modified to compute probabilities rather than complex events. The modified operators are denoted as $\sigma^e$, $\Pi^e$, $x^e$, which is much more efficient, since it involves manipulating real numbers rather than event expressions. A number $Pr_p(t) \in [0, 1]$ is defined for each tuple t, by induction on the structure of the query plan p. The inductive definitions below should be compared with those in Equation (1).

$$Pr_{\sigma_c^e(p)}(t) = \begin{cases} Pr_p(t) & \text{if } c(t) \text{ is true} \\ 0 & \text{if } c(t) \text{ is false} \end{cases} \quad (2)$$

$$Pr_{\Pi_{\bar{A}}^e(p)}(t) = 1 - \prod_{t' : \Pi_{\bar{A}}(t')=t} (1 - Pr_p(t'))$$

$$Pr_{p \times^e p'}(t, t') = Pr_p(t) \wedge Pr_{p'}(t')$$

Again, the tabular definitions of ($\sigma^e$, $\Pi^e$, $x^e$ follow easily: $\sigma^e$ acts like $\sigma$ and then propagates the tuples' probabilities from the input to the output, $\Pi^e$ computes the probability of a tuple t as $1-(1-p_1)(1-p_2) \ldots (1-p_n)$ where $p_1, \ldots, p_n$, are the probabilities of all input tuples that project to t, while x computes the probability of each tuple (t, $t_1$) as $p \times p_1$.

Thus, $p^e(D^p)$ is an extensional probabilistic relation, which is called the extensional semantics of the plan p. If $p^e(D^p) = q^{rank}(D^p)$ is known, then the plan is simply executed under the extensional semantics.

But, unfortunately, this is not always the case, as was noted above. Moreover, $p^e(D^p)$ depends on the particular plan p chosen for q. The goal is to find a plan for which the extensional semantics is correct.

Definition: Given a schema $\bar{R}^p$, $\Gamma^p$, a plan p for a query q is safe if $p^e(D^p) = q^{rank}(D^p)$ for all $D^p$ of that schema.

The Safe-Plan Optimization Algorithm

The following notations are used for conjunctive queries:
Rels(q)={$R_1, \ldots, R_k$} all relation names occurring in q. It is assumed that each relation name occurs at most once in the query (more detail on this point is provided below).
PRels(q)=the probabilistic relation names in q, PRels(q) $\subseteq$ Rels(q).
Attr(q)=all attributes in all relations in q. To disambiguate, the attributes are denoted as $R_i.A$.
Head(q)=the head attributes in q, Head(q)$\subseteq$Attr(q).

Let q be a conjunctive query. The induced functional dependencies $\Gamma^p(q)$ are defined on Attr(q):
Every functional dependency (FD) in $\Gamma^p$ is also in $\Gamma^p(q)$.
For every join predicate $R_i.A=R_j.B$, both $R_i.A \rightarrow R_j.B$ and $R_j.B \rightarrow R_i.A$ are in $\Gamma^p(q)$.
For every selection predicate $R_i.A=c$, $0 \rightarrow R_i.A$ is in $\Gamma^p(q)$.

A safe plan p is required, i.e., one that computes the probabilities correctly. For that, each operator in p must be safe, i.e., it must compute correct probabilities. The formal statement of this requirement follows.

Let $q_1$, $q_2$ be two queries, and let op $\in \{\sigma, \Pi, x\}$ be a relational operator. Consider the new query op($q_1$, $q_2$) (or just op($q_1$) when op is unary). It is noted that $op^e$ is safe if $op^e(Pr(q_1^i(D^p)), Pr(q_2^i(D^p))) = Pr(op^i(q_1^i(D^p)), q_2^i(D^p))$ (and similarly for unary operators), $\forall D^p$ s.t. $\Gamma^p = D^p$. In other words, op is safe if, when given correct probabilities for its inputs, $op^e$ computes correct probabilities for the output tuples.

Theorem 2: Let q, q' be conjunctive queries.
1. $\sigma_c^e$ is always safe in $\sigma_c(q)$.
2. $x^e$ is always safe in q$\times$q'.
3. $\Pi_{A_1, \ldots, A_k}^e$ is safe in $\Pi_{A_1, \ldots, A_k}(q)$ if and only if for every $R^p \in$ PRels(q) the following can be inferred from $\Gamma^p(q)$:
$A_1, \ldots, A_k, R^p.E \rightarrow$ Head(q)
A plan p is safe if and only if all operators are safe.

Theorem 2 can be better understood with reference to the following example.

EXAMPLE 3

Continuing the earlier example, assume that both $S^p$ and $T^p$ are extensional probabilistic relations, hence $\Gamma^p$ is:

$S^p.A, S^p.B \rightarrow S^p.E$ $T^p.C, T^p.D \rightarrow T^p.E$ $S^p.E!S^p.A, \rightarrow S^p.B$ $T^p.E!T^p.C, \rightarrow T^p.D$ The last two dependencies hold because the relations are extensional. Consider the plan $\Pi_D(S^p \bowtie_{B=C} T^p)$ It is shown in FIGS. 3A-3B that, when evaluated extensionally, this plan is incorrect. The reason is that the operator $\Pi_D^e$ is not safe. An intuitive justification can be seen immediately by inspecting the intensional relation $S^p \bowtie^{B=C} T^p$ of component 70 in FIG. 5A. The two complex events share the common atomic event $t_1$, hence they are correlated probabilistic events. But, the formula for $\Pi_D^e$ only works when these events are independent. It can be shown how to formally detect that $\Pi_D^e$ is unsafe. It is necessary to check:

$T^p.D, S^p.E \rightarrow S^p.A, S^p.B, T^p.C, T^p.D$ $T^p.D, T^p.E \rightarrow S^p.A, S^p.B, T^p.C, T^p.D$ The first follows from $\Gamma^p$ and from the join condition B=C, which adds $S^p.B \rightarrow T^p.C$ and $T^p.C \rightarrow S^p.B$.

But the second fails: $T^p.D, T^p.E$ does not yield $S^p.A$.

EXAMPLE 4

Continuing from the previous example, consider now the plan $\Pi_D(\Pi_B(S^p) \bowtie_{B=C} T^p)$. It is necessary to determine if $\Pi_D^e$ is safe. To do that, check:

$T^p.D, S^p.E \rightarrow S^p.B, T^p.C, T^p.D$ $T^p.D, T^p.E \rightarrow S^p.B, T^p.C, T^p.D$ Both hold, hence $\Pi_D^e$ is safe. Similarly, $\Pi_B^e$ is safe in $\Pi_B(S^p)$, which means that the entire plan is safe.

Algorithm 1 SAFE-PLAN(q)

```
if Head(q) = Attr(q) then
    return any plan p for q
    (p is projection-free, hence safe)
end if
for A ∈ (Attr(q) − Head(q)) do
    let q_A be the query obtained from q
        by adding A to the head variables
    if Π_Head(q)(q_A) is a safe operator then
        return Π_Head(q)(SAFE-PLAN(q_A))
    end if
end for
Split q into q_1 ⋈_C q_2 (see text)
if no such split exists then
    return error ("No safe plans exist")
end if
return SAFE-PLAN(q_1) ⋈_C SAFE-PLAN(q_2)
```

Algorithm 1, shown above, is an exemplary optimization algorithm employed in this novel approach for finding a safe plan. It proceeds top-down, as follows. First, it tries to do all safe projections late in the query plan. When no more late safe projections are possible for a query q, it then tries to perform a join $\bowtie_C$ instead, by splitting q into $q_1 \bowtie_C q_2$. Since $\bowtie_C$ is the last operation in the query plan, all attributes in c must be in Head(q).

Splitting q into $q_1 \bowtie_C q_2$ is done as follows. Construct a graph G whose nodes are Rels(q) and whose edges are all pairs $(R_i, R_j)$ such that q contains some join condition $R_i.A = R_j.B$ with both $R_i.A$ and $R_j.B$ in Head(q). Find the connected components of G, and choose $q_1$ and $q_2$ to be any partition of these connected components, which defines Rels($q_i$) and Attr($q_i$) for i=1, 2. Define Head($q_i$)=Head(q) ∩Attr($q_i$), for i=1, 2. If G is a connected graph, then the query has no safe plans (more on this below). If G has multiple connected components, then there are several choices for splitting q, and any standard cost-based optimization algorithm can be employed that works in a top-down fashion.

Finally, the algorithm terminates when no more projections are needed. The remaining join and/or selection operators can be done in any order.

EXAMPLE 5

Consider the original query in FIG. 2C, which is rewritten now as:

$q(D):-S^p(A, B), T^p(C, D), B=C$

Here Attr(q)={A, B, C, D} and Head(q)={D} (D is written instead of $T^p.D$, etc, since all attributes are distinct). The algorithm first considers the three attributes A, B, C in Attr(q)–Head(q), trying to see if they can be projected out late in the plan. A cannot be projected out. Indeed, the corresponding $q_A$ is:

$q_A(A, D):-S^p(A, B), T^p(C, D), B=C$ and $\Pi_D^e$ is unsafe in $\Pi_D(q_A)$ because $T^p.D, T^p.E$ do not yield $S^p.A$, as was shown in Example 3. However, the other two attributes can be projected out, hence the plan for q is $\Pi_D(q_{BC})$, where:

$q_{BC}(B, C, D):-S^p(A, B), T^p(C, D), B=C$

Now optimize $q_{BC}$, where Attr($q_{BC}$)={A, B, C, D}, Head($q_{BC}$)={B, C, D}. No projection is possible, but the query can be split into $q_1 \bowtie_{B=C} q_2$ where $q_1, q_2$ are:

$q_1(B):-S^p(A, B)$ $q_2(C, D):-T^p(C, D)$

The split $q_{BC} = q_1 \bowtie_{B=C} q_2$ is indeed possible since both B and C belong to Head($q_{BC}$). Continuing with $q_1, q_2$, no further steps are required in $q_2$, while in $q_1$, it is still necessary to project out A, $q_1 = \Pi_B(S^p)$, which is safe since B, $S^p.E \rightarrow A$. Putting everything together gives the following safe plan: $p' = \Pi_D(\Pi_B(S^p) \bowtie_{B=C} T^p)$ The soundness of the algorithm is apparent and the proof follows easily from the fact that all projection operators are safe. It will be shown in the next section that the algorithm is also complete.

Proposition: The safe-plan optimization algorithm is sound, i.e., any plan it returns is safe.

Theoretical Analysis

A fundamental result will now be applied to the complexity of query evaluation on probabilistic databases showing that there is a sharp separation of conjunctive queries into queries with low and high data complexity, and showing that the optimization algorithm is complete.

The data complexity of a query q is the complexity of evaluating $q^{rank}(D^p)$ as a function of the size of $D^p$. If q has a safe plan p, then its data complexity is in PTIME, because all extensional operators are in PTIME. For certain queries, it can be shown that the data complexity is #P-complete. #P is the complexity class of some hard counting problems. Given a boolean formula φ, counting the number of satisfying assignments, denote it #φ, is #P-complete. (Checking satisfiability, #φ>0, is NP-complete.) The data complexity of any conjunctive query is #P, since $q^{rank}(D^p) = Pr(q^i(D^p))$. The following is a variant of a result on query reliability by Gradel et al. in their paper entitled, "The complexity of query reliability," In Symposium on Principles of Database Systems, pages 227-234, 1998. The proof is novel and is of independent interest in this setting.

Theorem 3: Consider the following conjunctive query on three probabilistic tables:

$$q(\ ):-L^p(x), J(x, y), R^p(y)$$

Here $L_p$, $R_p$ are extensional probabilistic tables and $J$ is deterministic. The data complexity for q is #P-hard.

Proof: Others have shown that computing $\#\phi$ is #P-complete even for bipartite monotone 2-DNF boolean formulas $\phi$, i.e., when the propositional variables can be partitioned into $X=\{x_1, \ldots, x_m\}$ and $Y=\{y_1, \ldots, y_n\}$ such that $\phi = C_1 \vee \ldots \vee C_k$ where each clause $C_i$ has the form $x_j \wedge y_k$, $x_j \in X$, $y_k \in Y$.

(The satisfiability problem, $\#\phi > 0$, is trivially true.)

Given $\phi$, construct the instance $D^p$ where $L^p$ is X, $R^p$ is Y and J is the set of pairs $(x_j, y_k)$ that occur in some clause $C_i$. Assign independent probability events to tuples in $L^p$, $R^p$, with probabilities 1/2. Then, $q^{rank}(D^p)$ returns a single tuple, with probability $\#\phi/2^{m+n}$. Thus, computing $q^{rank}(D^p)$ is at least as hard as computing $\#\phi$.

The main theoretical result can now be stated and is considered to be a fundamental property of query evaluation on probabilistic databases.

Theorem 4: (Fundamental Theorem of Queries on Probabilistic DBs).

Consider a schema $R^p$, $\Gamma^p$ where all relations are probabilistic and $\Gamma^p$ has only the trivial FDs Attrs(R)→$R^p$.E, $R^p$.E→Attrs(R), for every $R^p$. Let q be a conjunctive query such that each relation occurs at most once. Assuming #P≠PTIME, the following statements are equivalent:

1. The query q contains three subgoals of the form:
   $L^p(x, \ldots), J^p(x, y, \ldots), R^p(y, \ldots)$
   where x, y ∉ Head(q).
2. The data complexity of q is #P-complete.
3. The SAFE-PLAN optimization algorithm fails to return a plan.

Proof: (Sketch) (1)⇒(2) is a simple extension of Theorem 3. (2)⇒(3) is obvious, since any safe plan has data complexity in PTIME. The proof of (3)⇒(1) is based on a detailed analysis of what happens when the SAFE-PLAN fails.

Theorem 4 provides a sharp separation of feasible and infeasible queries on probabilistic databases. It can be extended to mixed probabilistic/deterministic databases and richer functional dependencies.

Unsafe Plans

When a query's data complexity is #P-complete, then the SAFE-PLAN fails to return a plan. Since this result can indeed happen in practice, it is addressed and two solutions are proposed.

The first solution is referred to herein as the "Least Unsafe Plan." Here an attempt is made to pick a plan that is less unsafe than others, i.e., a plan that minimizes the error in computing the probabilities. Recall from Eq. (2) that $\Pi^e_{A_1, \ldots, A_k}$ is safe in $\Pi_{A_1, \ldots, A_k}(q)$ if and only if $A_1, \ldots, A_k, R^p.E \rightarrow$ Head(q) for every $R^p$. Let $\overline{B} = \{A_1, \ldots, A_k, R^p.E\} \cap $attr$(R^p)$ (hence $R^p.E \in \overline{B}$) and $\overline{C}=$Head(q) $\cap$ Attr($R^p$). Define $R_{fanout}^p$ to be the expected number of distinct values of $\overline{C}$ for a fixed value of the attributes $\overline{B}$. In a relational database system, it is possible to estimate this value using statistics on the table $R^p$. Define the degree of unsafety of $\Pi^e_{A_1, \ldots, A_k}$ to be $\max_{R^p \in PREL(Q)}(R_{fanout}^p - 1)$. Thus, a safe project has degree of unsafety 0. Also, the higher the degree of unsafety, the higher is the expected error that would result from using the extensional semantics for that project operator.

Algorithm 1 is modified to cope with unsafe queries. Recall that the algorithm tries to split a query q into two subqueries $q_1$, $q_2$ such that all their join attributes are in Head(q). Now this requirement is relaxed, allowing joins between $q_1$ and $q_2$ on attributes not in Head(q). Then, project out these attributes. These projections will be unsafe, hence it is desirable to minimize their degree of unsafety. To do that, pick $q_1$, $q_2$ to be a minimum cut of the graph, where each edge representing a join condition is labeled with the degree of unsafety of the corresponding project operation. (The estimator of $R_{fanout}^p$ should make sure that the estimated value is 0 only when the FD holds, otherwise the algorithm may favor "expected" safe plans over truly safe plans.) The problem of finding a minimum cut is polynomial time solvable as a series of network flow problems or using the algorithm of Stoer and Wagner, as explained in "A simple min cut algorithm," Algorithms—ESA '94, pages 141-147, 1994.

Monte-Carlo Approximations

As an alternative solution when a safe plan is NOT returned, an algorithm based on a Monte-Carlo simulation can be employed, which can guarantee an arbitrarily low error.

Given a conjunctive query q over probabilistic relations $R_1^p, R_2^p, \ldots, R_k^p$, let q' be its body, i.e., Head(q')=Attr(q')= Attr(q) and q=$\Pi_{Head(q)}$(q'). Modify q' to also return all event attributes $\overline{E}=R_1^k.E, \ldots, R_1^k.E$. Evaluate q' over the probabilistic database, and the tuples in the answer based on the values of their attributes Head(q). Consider one such group, and assume it has n tuples $t_i, \ldots t_n$. The group defines the following complex event expression: $\vee_{i=1}^n C_i$, where each $C_i$ has the form $e_1 \wedge \ldots \wedge e_k$. It is then necessary to compute its probability, which will be the probability of one tuple in $q^{rank}(D^p)$. For that step, use the Monte-Carlo algorithm; when run for $$N \geq \frac{4n}{\varepsilon^2}\ln\frac{2}{\delta}$$

iterations, the algorithm guarantees that the probability of the error being greater that $\epsilon$ is less than $\delta$.

Extensions

Additional Operators: So far, the discussion has been limited to conjunctive queries, or, equivalently to the algebra consisting of σ, Π, ×. It will now be shown how to extend these techniques to ∪, −, γ (union, difference, group-by-aggregate). A large fragment of SQL, including queries with nested sub-queries, aggregates, group-by and existential/universal quantifiers can be expressed in this logical algebra. (Omitted is the operator for δ (duplicate elimination), since only queries with set semantics are being considered, i.e., δ is implicit after every projection and union.) The extensional semantics for these operators is defined using the following functional notation.

$$Pr_{p \cup_{e_{p'}}}(t) = 1-(1-Pr_p(t))\times(1-Pr_{p'}(t))$$

$$Pr_{p-e_{p'}}(t) = Pr_p(t)\times(1-Pr_{p'}(t))$$

$$Pr_{\gamma^e_{\overline{A},\min(B)}}(t) = Pr_p(t) \times \prod_{\substack{s:s.\overline{A}=t.\overline{A} \\ \wedge s.B<t.B}} (1 - Pr_p(s))$$

$$Pr_{\gamma^e_{\overline{A},\max(B)}}(t) = Pr_p(t) \times \prod_{\substack{s:s.\overline{A}=t.\overline{A} \\ \wedge s.B>t.B}} (1 - Pr_p(s))$$

For example, to compute the group-by-min operator $\gamma_{A, \min(B)}(R^p)$, one considers each tuple (a, b) in $R^p$: the probability that (a, b) is in the output relation is $p(1-p_1) \ldots (1-p_n)$ where p is the probability of the tuple (a, b), while $p_1, \ldots, p_n$ are the probabilities of all other tuples (a, b') such that b'<b. In the case of sum, the aggregated attribute may take values that are not in the input table. To compute the probabilities correctly, one needs to iterate over exponentially many possible sums. Instead, simply compute the expected value of the sum (details omitted), which is meaningful to the user if sum appears in the SELECT clause, but less so if it occurs in a HAVING clause. Treat COUNT similarly.

Sufficient conditions for these operators to be safe are noted below.

Theorem 5: Let q, q' be a conjunctive queries.
1. $\cup^e$ is safe in $q\cup^e q'$ if $PRels(q) \cap PRels(q') = \phi$.
2. $-^e$ is safe in $q\cap^e q'$ if $PRels(q) \cap PRels(q') = \phi$.
3. $\gamma_{\overline{A}, agg(B)}$ is safe in $\gamma_{\overline{A}, agg(B)}(q)$ if $\Pi_{\overline{A}}(q)$ is safe, where agg is min or max.

Self-Joins: Self-joins on probabilistic relations may be a cause of #-P-complete data complexity. However, a query $q^\sim$ with uncertain predicate rarely results in self-join. Even if the same table R occurs twice in $q^\sim$, the different uncertain predicates on the two occurrences generate distinct events, hence the system makes two probabilistic "copies": $R_1^p$, $R_2^p$. Of course, the Monte-Carlo algorithm works fine even in the presence of self joins.

Extending the Optimization Algorithm: SAFE-PLAN is extended to handle each block of conjunctive queries separately. As an example, the query noted above, asking for an actor whose name is like "Kevin" and whose first "successful" movie appeared in 1995, has a safe plan as shown below:

$\Pi_{name}(A \bowtie_{actorid}(\sigma_{year=1995}(\gamma_{actorid, \min(year)}(\Pi_{actorid, year}C))))$ Atomic Predicates One of the main motivations is executing a query with uncertain predicates $q^\sim$ on a deterministic database D. As seen above, the approach used is to apply the uncertain predicates first, and generate a probabilistic database $D^p$, then evaluate q (without the uncertain predicates). Briefly, choices for the uncertain predicates proposed in the prior art all depend on a notion of closeness between two data values. This prior art approach is domain dependent and can be classified into three categories:

Syntactic Closeness: This category applies to domains with proper nouns, like people's names. Edit distances, q-grams and phonetic similarity can be employed. The prior art provides excellent surveys on string matching techniques describing more than 40 techniques and compares them experimentally. This prior art also discusses the probability of string matching. The present novel system employs the 3-gram distance between words, which is the number of triplets of consecutive words common to both words. It was found that this approach works faster and more accurately than edit distances.

Semantic Closeness: This category applies to domains that have a semantic meaning, like film categories. A user query for the category "musical" should match films of category "opera." Semantic distance can be calculated by using TF/IDF or with ontologies like Wordnet. Semantic distances are not currently employed in the present novel system.

Numeric Closeness: This category applies to domains like price and age. A distance can be just the difference of the values. Once distances are defined between attributes, using any of the above methods, they need to be meaningfully converted into probabilities. A Gaussian curve has been fitted on the distances as follows. The curve was centered around the distance 0 where it took value 1. The variance of the Gaussian curve is an indication of the importance of match on that attribute. Its correct value depends on the domain and user preferences. In the experiments discussed below, fixed query independent values were used for the variances.

Finally, one issue is when to generate new probability events. For example, consider the uncertain predicate Product.category$\approx$ ... and assume there are two products with the same category. Should they result in two independent probabilistic events with the same probabilities, or in the same probabilistic event? Both choices are possible in the present novel system. In the first case, the functional dependency is Product$^p$.key$\rightarrow$Product$^p$.E while in the second, the FD is Product$^p$.category$\rightarrow$Product$^p$.E. In the latter case, $\Pi_{category}$ becomes unsafe, which can be addressed by normalizing the resulting database to the third normal form (3NF), i.e., creating a separate category table that contains the events for categories.

Experiments

Some preliminary evaluation of the probabilistic query evaluation framework has been performed empirically to address the following four questions.

(1) How often does the SAFE-PLAN optimization algorithm fail to find a plan?

(2) What is the performance of safe plans, when they exist?

(3) Are naive approaches to query evaluation perhaps almost as good as a safe plan?

(4) How effectively can queries that do not have safe plans be handled?

To provide answers to these questions, it was not necessary to modify the relational engine normally used for handling data table queries; instead, a middleware approach was implemented. SQL queries with approximate predicates were reformulated into "extensional" SQL queries, using the techniques described herein, and using calls to a Transact—Structured Query Language (TSQL) function for computing 3-gram distances. These queries were then executed by the relational engine and returned both tuples and probabilities. Microsoft Corporation's SQL Server™ software program was used, and the Transaction Processing Council Ad-hoc/decision support benchmark (TPC-H) (indicative of computer performance) was used to evaluate the queries, with a database that was about 0.1 GB in size. All queries were modified by replacing all the predicates in the WHERE clause with uncertain matches. The constants in the queries were either misspelled or made vague. For instance, a condition like part.container="PROMO PLATED GREEN" was replaced with part.container$\approx$"GREEN PLATE." When executed exactly, all modified queries returned empty answers.

1. Frequency of Unsafe Queries: In the first experiment, the intent was to determine how many queries do not have safe plans. Out of the ten TPC-H queries, eight were found to have safe plans. $Q_7$ and $Q_8$ were the only queries that were unsafe. These also become safe if not all of their predicates are uncertain.

2. Performance: Next, the running times for the eight queries that have safe plans were measured, as shown by bar graph 80 in FIG. 6. All times are actual time. The first column is the running time of the safe plan, and the second column represents an optimization where at each intermediate stage, tuples with zero probability are discarded. This optimization does not affect the final answer and as can be seen from the graph, it brings about considerable savings for some queries. This optimization also suggests the use of other optimizations, e.g., an early removal of tuples with low probabilities, if the user is only interested in tuples with high probability. The third column in the graph shows the time for running safe queries, without taking into account the computation time for the uncertain predicate, which, in this case, is the 3-gram distance. The graphs show that most of the time is spent in computing the uncertain predicates. (For $Q_3$, the running time was almost negligible.) This graph suggests that important improvements would be achieved if the predicates were implemented in the engine.

Figure 7:
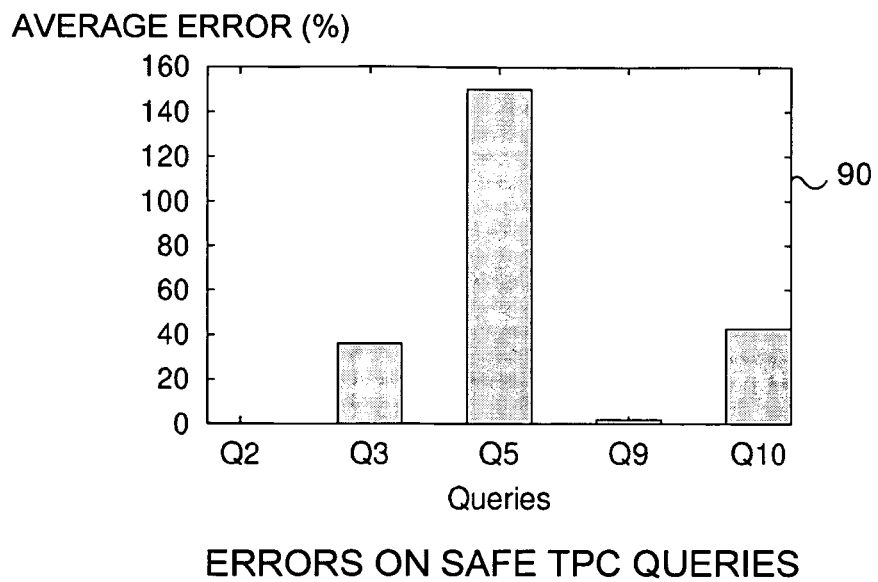
FIG. 7 is a graph illustrating the average error (%) in safe TPC queries from the queries run in FIG. 6.

3. Naive Approaches: In the next experiment, the error produced by a naive extensional plan was calculated. The naive plan that leaves all project operators (and the associated duplicate elimination) at the end of the plan was considered, which is typical of plans produced by database optimizers. A bar graph 90 in FIG. 7 shows the percentage relative error of naive plans. Only the eight queries that have safe plans were considered. The naive plans for $Q_1$, $Q_4$, and $Q_6$ were already safe, and hence, had no errors (and SAFE-PLAN indeed returned the same plan); these queries are not shown. Queries $Q_3$, $Q_5$, and $Q_{10}$ had large errors with $Q_5$ showing an average error of 150% in the tuple probabilities. Queries $Q_2$ and $Q_9$ had negligible errors. Thus, while some naive plans were bad, others were reasonable. But, in general, naive plans can be arbitrarily bad. However, it can be argued that the low extra complexity of searching for a safe plan is a price worth paying in order to avoid the (admittedly rare) possibility of arbitrarily large errors.

Figure 8:
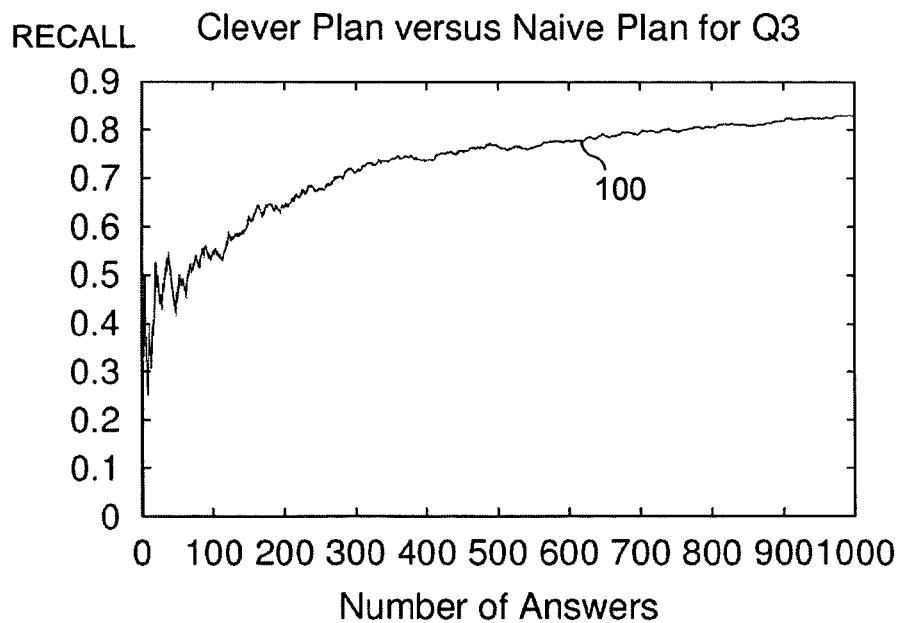
FIG. 8 is a graph showing recall versus the number of answers for the third query of FIG. 6.
Figure 9:
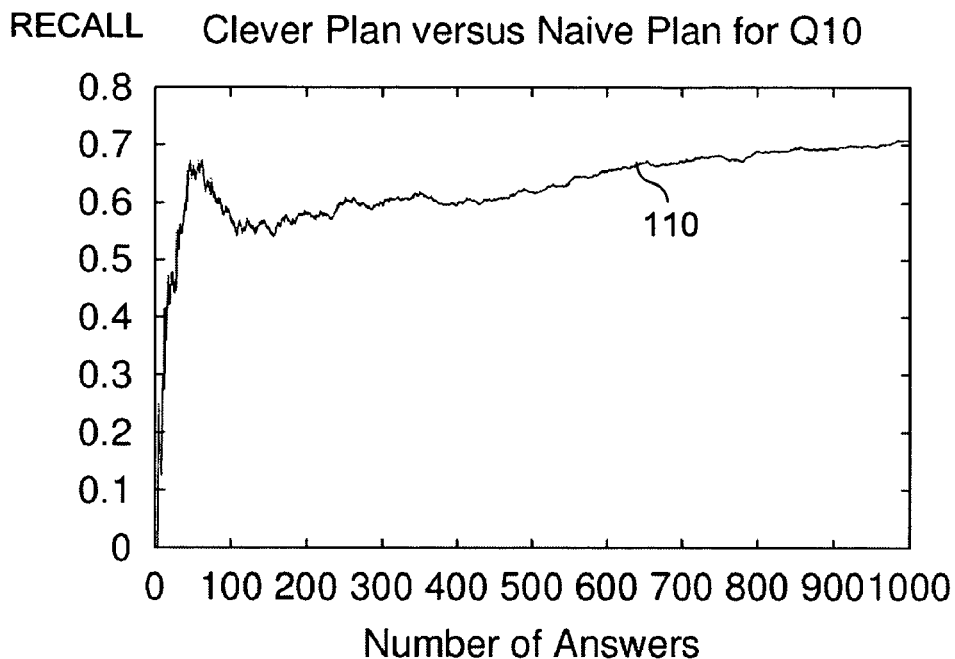
FIG. 9 is a graph showing recall versus the number of answers for the tenth query of FIG. 6.

However, since the interest was only in ranking the results, not in the actual probabilities, it is worth asking whether high errors in the probabilities translate into high ranking results. The recall graphs were plotted for queries $Q_3$ and $Q_{10}$ (for which the naive plan produced only medium errors). Recall is defined as the fraction of answers ranked among top N by the naive plan that should actually have been in top N. This value was plotted as a function of N. Lines 100 and 110 in FIGS. 8 and 9, respectively, show the recall graphs. By definition, the recall approaches 1 when N approaches the total number of possible tuples in the answer. However, as these two graphs show, the recall was poor for small values of N. A user looking for the top 50 to 100 answers to $Q_3$ would miss half of the relevant tuples. For smaller values of N (say, ten) the naive approach misses 80% of the relevant tuples.

Figure 10:
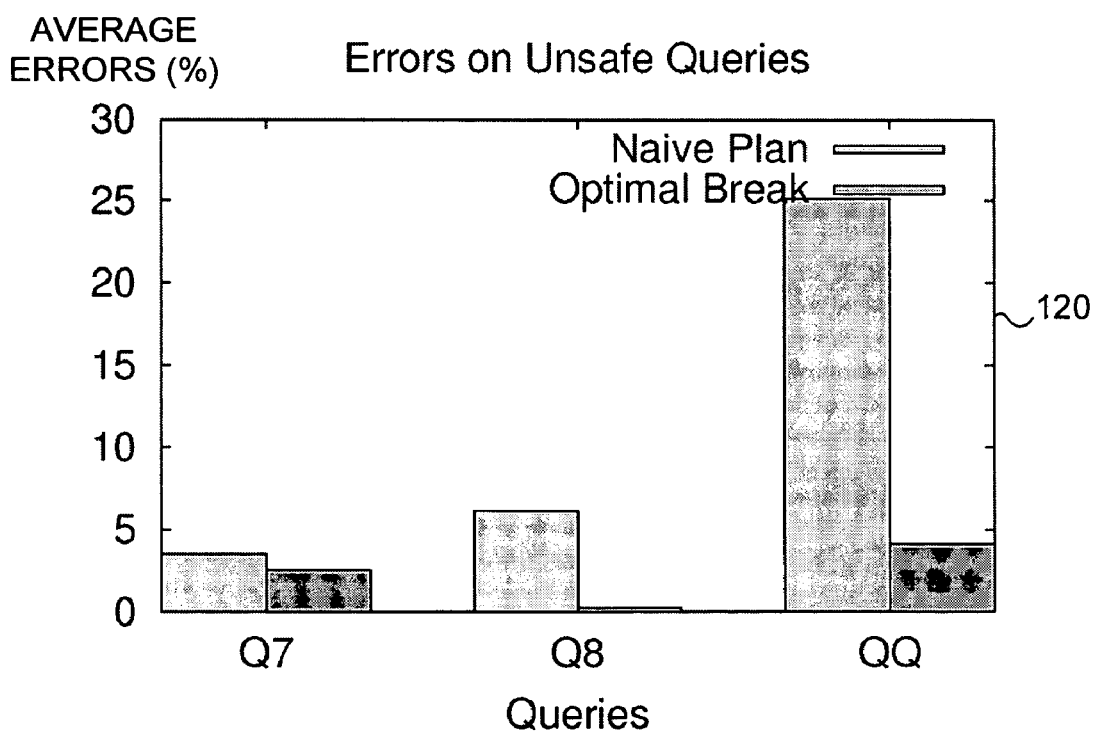
FIG. 10 is a graph showing the average error (%) for the seventh and eighth queries (which were unsafe) of FIG. 6 for a new unsafe query, in regard to a naive plan and in regard to an optimized break approach that employs the least unsafe plan.

4. Unsafe Queries Finally, this approach was tested to determine how it handles queries with no safe plans on $Q_7$ and $Q_8$. The Monte-Carlo simulation was run to compute the answer probabilities for these two queries and the results were used as a baseline. A bar graph 120 in FIG. 10 shows the errors in evaluating them with a naive plan and the least unsafe plan (using min-cut, as discussed above). The graphs show that the plan chosen by the optimizer was better, or significantly better than a naive one. Still, from two data points, it is hard to judge the improvement over a naive plan. To see a third data point, a new unsafe query, QQ, was written. In this new unsafe query, the relation line item is joined with orders and suppliers. Here the fanout is larger, and the difference between the naive plan and the optimal break is more pronounced.

Logical Steps for Evaluating Queries of Probabilistic Databases

Figure 11:
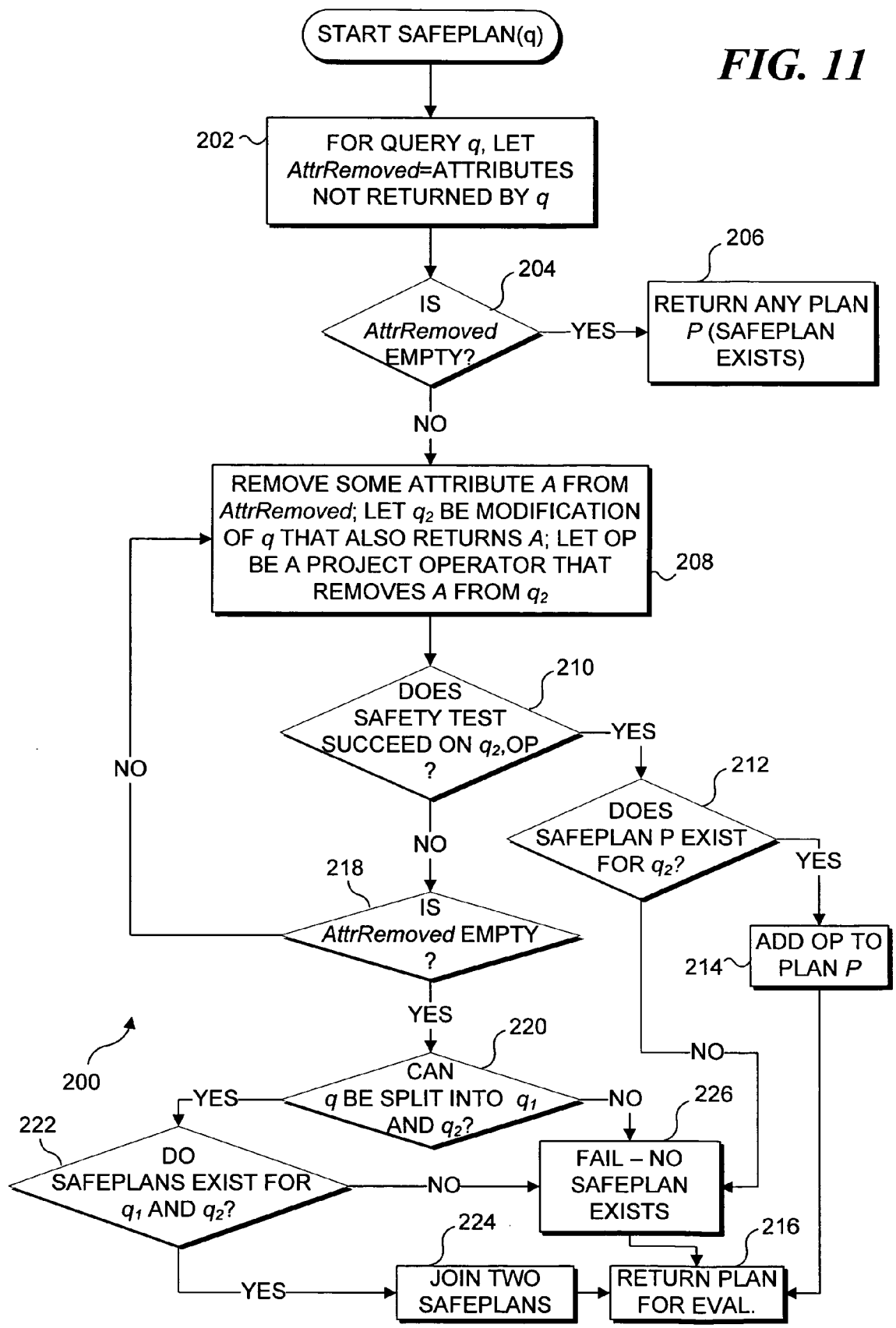
FIG. 11 is a flowchart illustrating exemplary logical steps for testing the "safety" of operator that appear in a query.

The logical steps of an exemplary approach for evaluating a query, q, of a probabilistic database, as generally described above, are illustrated in a flowchart 200 in FIG. 11. This approach starts with a step 202, which sets "AttrRemoved" equal to the attributes that are not returned by the query; AttrRemoved is thus the same as Attr(q)–Head(q), as discussed above. A decision step 204 determines if AttrRemoved is empty, which will be the case if Attr(q)=Head(q). If so, a step 206 notes that a SafePlan exists, i.e., that any plan p can be used to evaluate the query. Conversely, if the result of decision step 204 is negative, a block 208 recites several steps that are carried out. Specifically, some attribute A is removed from AttrRemoved, followed by letting $q_2$ be a modification of q that also returns A, and then, letting an operator be a project operator that removes A from $q_2$.

Figure 12:
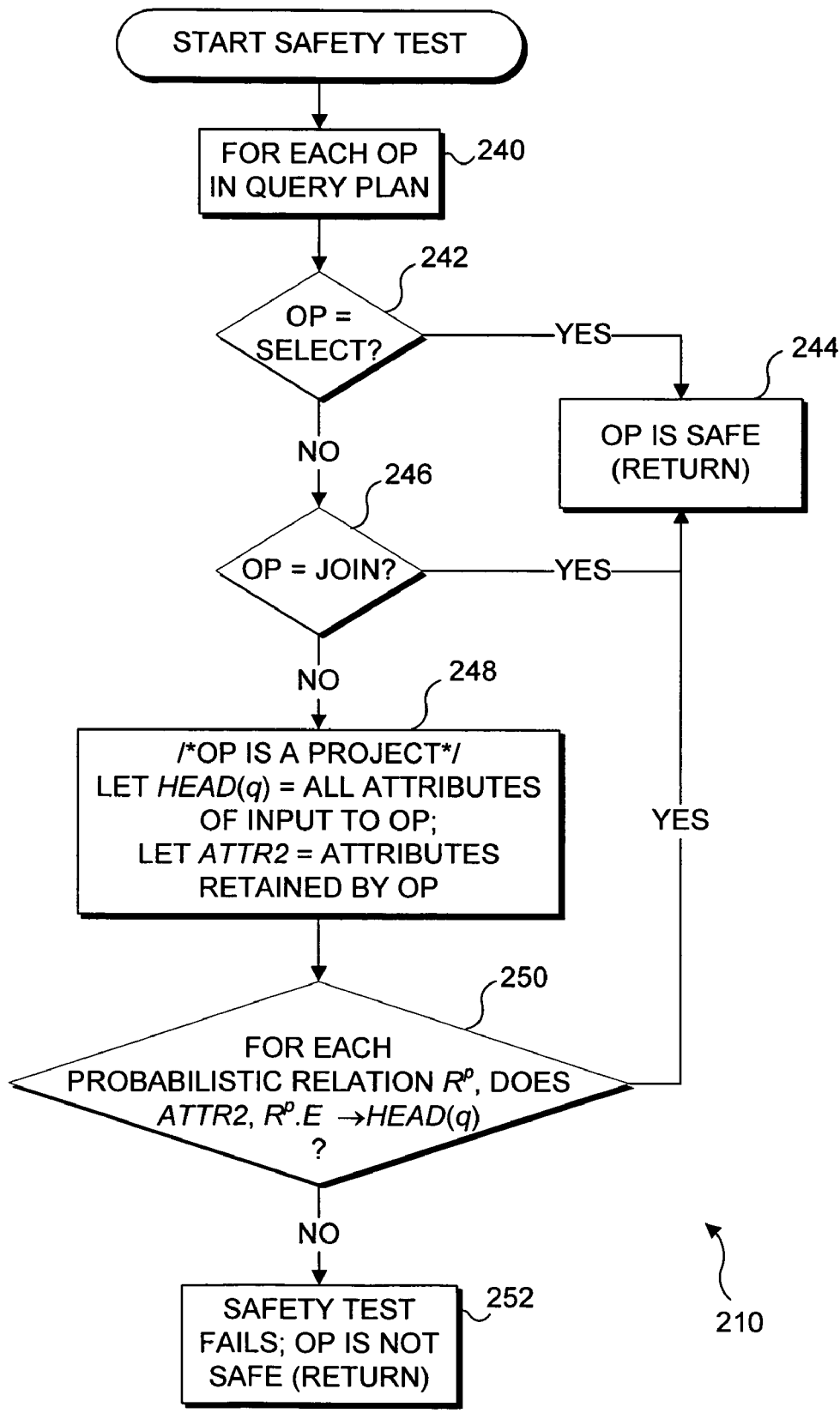
FIG. 12 is a flowchart illustrating exemplary logical steps for splitting a query, q, into queries q1 and q2 in a safe way.

Next, a decision step 210 determines if a "safety test" succeeds on $q_2$ and the project operator (details of this decision step are shown in FIG. 12, which is discussed below). If so, a decision step 212 determines if a SafePlan exists for $q_2$. If so, a step 214 adds the project operator to plan p. The logic then proceeds with a step 216, which returns plan p for evaluation of the query.

Figure 13:
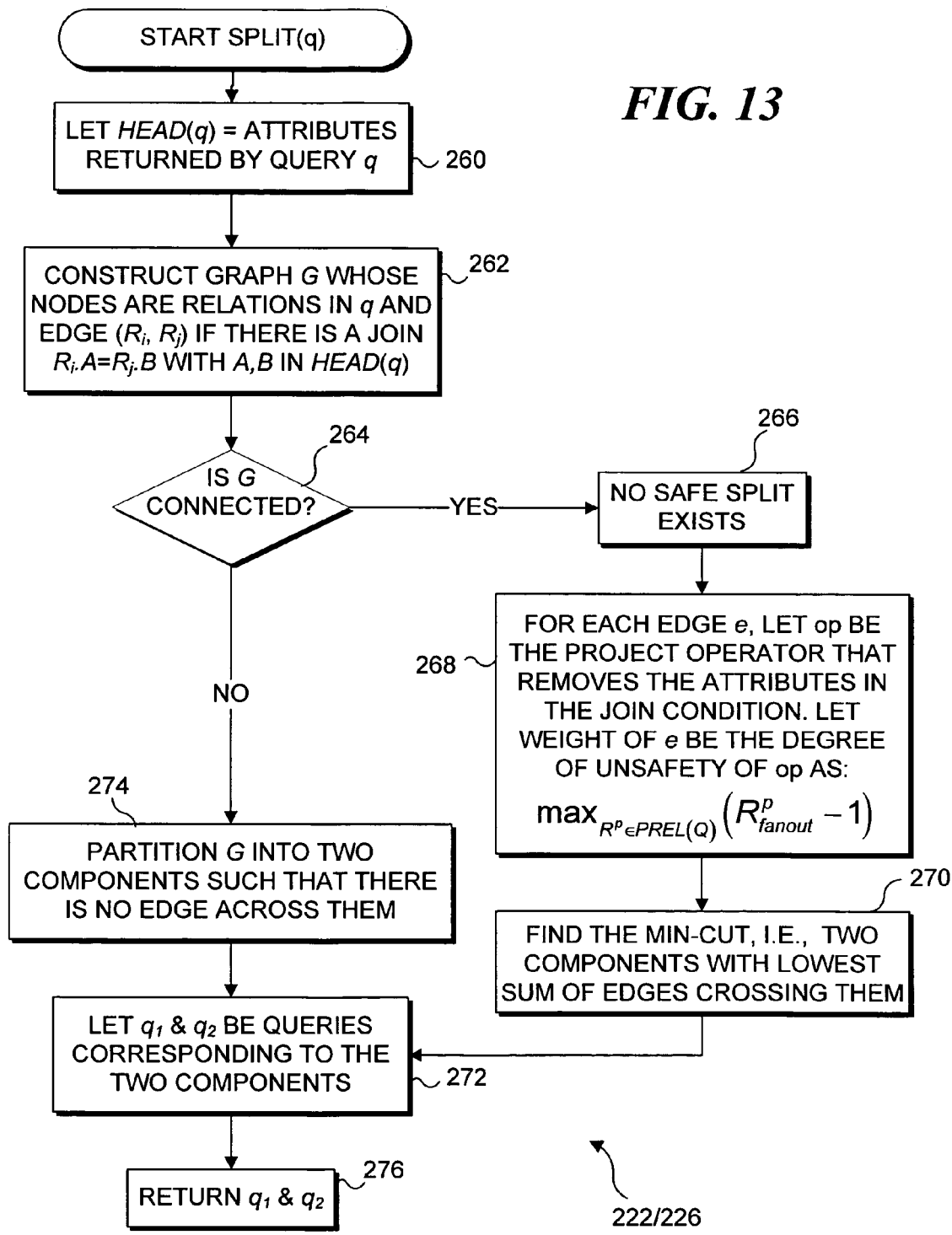
FIG. 13 is a flowchart showing exemplary logical steps for finding a safe plan for a query (if one exists)

A negative response to decision step 210 leads to a decision step 218, which again determines if AttrRemoved is empty (after removing attribute A). If not, the logic loops back to block 208 to repeat the steps carried out therein, starting with removing another attribute from AttrRemoved. However, if the determination in decision step 218 is affirmative, a decision step 220 determines if the query q can be split into sub-queries $q_1$ and $q_2$. If so, a decision step 222 determines if SafePlans exist for sub-queries $q_1$ and $q_2$. Details of this decision step are shown in FIG. 13 and discussed below. If so, a step 224 provides for a join of the two SafePlans for queries $q_1$ and $q_2$. The result is used in the plan returned for evaluation. A negative result for each of decision steps 212, 220, and 222 leads to a step 226, which indicates that a SafePlan does not exist, so that an alternative (a least unsafe plan or a plan provided using the Monte-Carlo algorithm) must instead be used in step 216 for evaluating the query.

FIG. 12 illustrates the logical steps for implementing decision step 210. A step 240 indicates that the following steps are implemented for each operator in the proposed query plan. A decision step 242 determines if the operator is a select operator. If so, a step 244 indicates the operator is safe, and returns to decision step 212 in FIG. 11. Conversely, if the operator is not a select operator in decision step 242, a decision step 246 determines if the operator is a join operator, and if so, also returns via step 244, as noted above. If not, a step 248 determines that the operator must be a project operator. Also, this step lets Head(q) equal all attributes of the input to the project operator, and lets Attr2 equal attributes retained by the project operator. A decision step 250 then determines, for each probabilistic relation $R^p$, if Attr2, $R^p.E \rightarrow$Head(q). If so, the project operator is safe, and the logic returns via step 244. Otherwise, in a step 252, the logic determines that the safety test has failed, since the operator is not safe, and returns to decision step 212 in FIG. 11.

Details relating to decision step 222 and to step 226 are indicated in the flowchart shown in FIG. 13. A step 260 lets Head(q) equal the attributes returned by query q. A step 262 then provides for constructing a graph G whose nodes are relations in q and edge ($R_i$, $R_j$) if there is a join $R_i.A=R_j.B$ with A, B in Head(q). A decision step 264 determines if G is connected. If so, a step 266 indicates that a safe split of the query does not exist. A step 268 then lets an operator be a project operator that removes the attributes in the join condition, and lets the weight of e be the degree of unsafety of the operator, as indicated by $\max_{R^p \in PREL(Q)}(R_{fonout}^p - 1)$.

A step 270 finds the min-cut, which is the two components with the least sum of edges crossing them in the graph G. A step 272 lets $q_1$ and $q_2$ be queries corresponding to the two components. The two queries $q_1$ and $q_2$ are then returned to be evaluated, as indicated in a step 276, which corresponds to step 216 (shown in FIG. 11).

If the result of decision step 264 is negative, a step 274 partitions graph G into two components such that there is no edge across them and then proceeds to step 272, where the two components are now the ones from step 274 instead of from step 270. Accordingly, the method finds a safe plan if one exists and uses it to evaluate the query. If a safe plan does not exist, then the method determines a least unsafe plan with the lowest error rate for evaluating the query (or alternatively, the Monte-Carlo algorithm can be used for evaluating the query).

Exemplary System for Executing the Method

Figure 14:
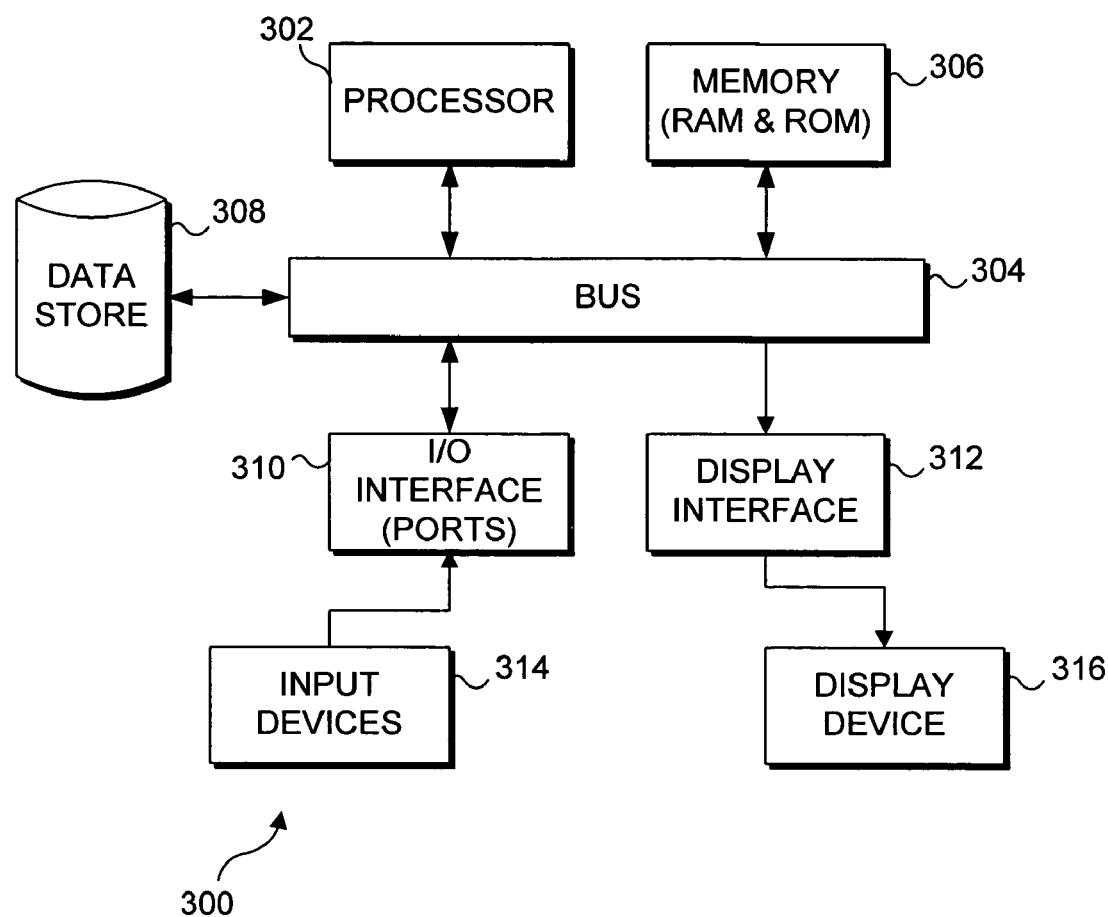
FIG. 14 is a functional block diagram of a computing device that is useful for evaluating a query of a probabilistic database in accord with the present novel approach.

FIG. 14 illustrates a simplified block diagram of a system or computing device 300 that is suitable for implementing the exemplary method discussed above. A processor 302 is employed for executing machine instructions that are stored in a memory 306. The machine instructions may be transferred to memory 306 from a data store 308 over a generally conventional bus 304, or may be provided on some other form of memory media, such as a digital versatile disk (DVD), a compact disk read only memory (CD-ROM), or other non-volatile memory device. Processor 302, memory 306, and data store 308, which may be one or more hard drive disks or other non-volatile memory, are all connected in communication with each other via bus 304. Also connected to the bus are an input/output interface 310 (which may include one or more data ports such as a serial port, a universal serial bus (USB) port, a Firewire (IEEE 1394) port, a parallel port, a personal system/2 (PS/2) port, etc.), and a display interface or adaptor 312. Any one or more of a number of different input devices 314 such as a keyboard, mouse or other pointing device, trackball, touch screen input, etc. are connected to I/O interface 310. A monitor or other display device 316 is coupled to display interface 312, so that a user can see the results of a query and can interact with the rest of the system in formulating the query, which will typically be in SQL.

Although the present technology has been described in connection with the preferred form of practicing it and modifications thereto, those of ordinary skill in the art will understand that many other modifications can be made thereto within the scope of the claims that follow. Accordingly, it is not intended that the scope of the technology in any way be limited by the above description, but instead be determined entirely by reference to the claims that follow.

The invention claimed is:

1. A method for determining a result for a query of data in a probabilistic database, wherein elements of the data are each associated with a probability, a result for the query including a probability for each answer of the result to indicate a relative likelihood that the answer satisfies the query, comprising the steps of:
   (a) determining if a safe extensional plan defining an order for operators employed in the query can be identified, wherein for conjunctive queries q, q' that include any union operator, any difference operator, or any group-by-aggregate operator:
      (i) a selection operator, $\sigma_c^e$, which returns a probability, is always safe in $\sigma_c(q)$;
      (ii) a join operator, $\times^e$, is always safe in $q \times q'$; and
      (iii) where $A_1, \ldots, A_k$ are attributes of relations in q, a project operator $\Pi_{A_1, \ldots, A_k}^e$ is safe in $\Pi_{A_1, \ldots, A_k}(q)$ if and only if, for every probabilistic relation, $R^p$, which is an element of probabilistic relation names occurring in q for said attributes, as denoted by $R^p \in PRels(q)$, $A_1, \ldots, A_k$, a probabilistic event yielding head attributes, as indicated by $R^p.E \rightarrow Head(q)$, can correctly be inferred from a set of induced functional dependencies on q, indicated by $\Gamma^p(q)$; and
      (1) if a safe extensional plan can be identified, employing the safe extensional plan to evaluate the query and determine the result that includes a correct probability for each potential answer within the data; and
      (2) if a safe extensional plan cannot be identified, selecting an alternative plan that will produce the result with an acceptable error in the probability for each potential answer within the data, and employing the alternative plan to produce the result; and
   (b) providing the result to a user.

2. The method of claim 1, wherein the query includes a predicate associated with an uncertain match, to indicate that the result can have an approximate match to the predicate, further comprising the step of assigning a probability to each tuple in any table of the data that must be searched for an approximate match to the predicate in the query, the probability that is assigned indicating how well the tuple matches the predicate in the query.

3. The method of claim 1, further comprising the steps of:
   (a) sorting the answers to the query as a function of the probabilities of the answers; and
   (b) including at least a subset of the answers having the highest probabilities in the result provided to the user.

4. The method of claim 1, wherein the step of selecting the alternative plan comprises the step of selecting as the alternative plan, one of:
   (a) a least unsafe plan that minimizes the error in computing the probabilities of the answers to the query; and
   (b) based on a Monte-Carlo simulation, selecting the alternative plan so as to guarantee a predefined arbitrarily low error in the probabilities of the answers to the query.

5. The method of claim 1, wherein the step of determining if a safe extensional plan can be identified comprises the step of evaluating each operator included in the query to determine if the operator is safe, and if so, determining that an extensional plan is a safe extensional plan.

6. The method of claim 1, wherein the step of determining if a safe extensional plan can be identified further comprises the steps of:
   (a) determining that a proposed extensional plan is a safe extensional plan if the proposed extensional plan does not employ any project operator; but if the proposed extensional plan includes a project operator; then, (b) attempting to apply all safe projection operations late in the query, before any projection operation that is not safe, and if it is not possible to perform any more projection operations that are safe for the query; then, (c) attempting to perform a join operation instead, by splitting the query into two queries, $q_1$ and $q_2$, which are joined, as indicated by $q_1 \bowtie_c q_2$, where the joining of the two queries is the last operation in the proposed plan, so that all attributes in c must be in the head attributes for the query, Head(q).

7. The method of claim 6, wherein the step of splitting the query into the two queries comprises the steps of:

(a) constructing a graph G having nodes that are relation names appearing in the query and having edges that are pairs, such that the query contains some join condition, $R_i.A=R_j.B$ with both $R_i.A$ and $R_j.B$ in the head attributes for the query, Head(q);

(b) finding connected components of graph G;

(c) choosing the two queries, $q_1$ and $q_2$, to be any partition of the connected components, thereby defining relation names appearing in each of the two queries, indicated as Rels($q_i$), and attributes of the two queries, indicated as Attr($q_i$), for i=1, 2;

(d) defining the head attributes for the two queries, as Head($q_i$)=Head(q)∩Attr($q_i$), for i=1, 2;

(e) wherein, if graph G is a connected graph, the query does not have any safe plan, while if graph G has multiple connected components; then, (f) employing a cost-based algorithm to determine how to split the query into the two queries in a most optimal manner.

8. The method of claim 5, wherein for conjunctive queries q, q', if the query includes any union operator, any difference operator, or any group-by-aggregate operator:

(a) a union operator, $\cup^e$, is safe in $q\cup^e q'$, if PRels(q) ∩PRels(q')=φ, (b) a difference operator, $-^e$, is safe in $q\cap^e q'$, if PRels(q) ∩PRels(q')=φ; and (c) a group-by-aggregate operator, $\gamma_{\overline{A},agg(B)}$ is safe in $\gamma_{\overline{A},agg(B)}(q)$, if $\Pi_{\overline{A}}(q)$ is safe, where agg is a minimum or a maximum.

9. The method of claim 1, wherein if an extensional semantics of a plan is known to equal probabilistic rankings of the data for the query, then the plan is a safe extensional plan.

10. The method of claim 1, wherein the query is formulated in structured query language (SQL).

11. A method for evaluating a query of data in a probabilistic database, in which elements of the data are associated with probabilities between zero and one, and wherein the query is defined using structured query language (SQL), the query returning a result for each answer of the result, indicating a relative likelihood that the answer satisfies the query, comprising the steps of:

(a) determining if a proposed plan for evaluating the query includes any unsafe operator that may cause an incorrect result, and if so, determining if the query can be split into two sub-queries so that evaluation of a join of the two sub-queries will return a correct result for the query;

(b) if the proposed plan for evaluating the query does not include an unsafe operator; using the proposed plan, which is a safe plan, to evaluate the query, producing the result, wherein for conjunctive queries q, q' that include any union operator, any difference operator, or any group-by-aggregate operator:

(i) a selection operator, $\sigma_c^e$, which returns a probability, is always safe in $\sigma_c(q)$;

(ii) a join operator, $\bowtie^e$, is always safe in q×q'; and (iii) where $A_1, \ldots, A_k$ are attributes of relations in q, a project operator $\Pi_{A_1, \ldots, A_k}^e$ is safe in $\Pi_{A_1, \ldots, A_k}(q)$ if and only if, for every probabilistic relation, $R^P$, which is an element of probabilistic relation names occurring in q for said attributes, as denoted by $R^P \in$ PRels(q), $A_1, \ldots, A_k$, a probabilistic event yielding head attributes, as indicated by $R^P.E \rightarrow$ Head (q), can correctly be inferred from a set of induced functional dependencies on q, indicated by $\Gamma^P(q)$;

(c) if the proposed plan for evaluating the query includes an unsafe operator, but the query can be split into the two sub-queries so that evaluation of the join of the two sub-queries will return a correct result for the query, considering the proposed plan a safe plan and evaluating the join of the two sub-queries to produce the result;

(d) if the proposed plan for evaluating the query includes an unsafe operator and the query cannot be split into the two sub-queries so that evaluation of the join of the two sub-queries will return a correct result for the query, selecting an alternative plan for evaluating the query to produce the result with an acceptable error in the relative probabilities; and (e) providing the result to a user.

12. The method of claim 11, wherein each row of the data in the probabilistic database comprises an element of the data, and wherein each row is associated with a probability between zero and one, inclusive.

13. The method of claim 11, wherein the step of determining if the query can be split into two sub-queries so that evaluation of a join of the two sub-queries will return a correct result for the query further comprises the steps of:

(a) constructing a graph having nodes that are relations in the query, and an edge ($R_i$, $R_j$), such that the query includes a join condition $R_i.A=R_j.B$, with both $R_i.A$ and $R_j.B$ included in head attributes for the query; and (b) determining if the graph is connected, whereby if the graph is connected, the query cannot be split into sub-queries to produce the correct result by evaluating the join of the sub-queries.

14. The method of claim 13, wherein if the graph is connected, the step of selecting the alternative plan comprises the step of selecting a least unsafe plan for which evaluation of the query produces a result with a minimum error in the probabilities for each of the answers.

15. The method of claim 14, wherein the step of selecting the least unsafe plan comprises the steps of:

(a) for each edge, identifying a project operator that removes attributes in the join condition;

(b) determining a weight of the edge, said weight of the edge corresponding to a degree of unsafety of the edge;

(c) finding a minimum cut of the graph, resulting in the two sub-queries having the lowest sum of edges crossing the two sub-queries in the graph; and (d) employing the two sub-queries in the alternative plan for evaluating the query.

16. The method of claim 13, wherein if the graph is not connected, further comprising the steps of:

(a) partitioning the graph into the two sub-queries, such that there is no edge across the sub-queries; and (b) using the join of the two sub-queries to evaluate the query and to return the result for the query.

17. The method of claim 11, wherein for conjunctive queries q, q' that include any union operator, any difference operator, or any group-by-aggregate operator:
   (a) a union operator, $\cup^e$, is safe in $q\cup^e q'$, if PRels(q) ∩PRels(q')=φ,
   (b) a difference operator, $-^e$, is safe in $q\cap^e q'$, if PRels(q) ∩PRels(q')=φ; and
   (c) a group-by-aggregate operator, $\gamma_{\overline{A},agg(B)}$, is safe in $\gamma_{\overline{A},agg(B)}(q)$, if $\Pi_{\overline{A}}(q)$ is safe, where agg is a minimum or a maximum.

18. A system for determining a result for a query of data in a probabilistic database, wherein elements of the data are each associated with a probability, a result for the query including a probability for each answer of the result to indicate a relative likelihood that the answer satisfies the query, comprising:
   (a) a store that retains the data in the probabilistic database;
   (b) a memory that stores machine instructions, as well as data transferred from the store; and
   (c) a processor coupled to the store and to the memory, the processor executing the machine instructions stored in the memory to carry out a plurality of functions, including:
     (i) determining if a safe extensional plan defining an order for operators employed in the query can be identified, wherein for conjunctive queries q, q' that include any union operator, any difference, operator, or any group-by-aggregate operator:
       (1) a selection operator, $\sigma_c^e$, which returns a probability, is always safe in $\sigma_c(q)$;
       (2) a join operator, $\times^e$, is always safe in q×q'; and
       (3) where $A_1, \ldots, A_k$ are attributes of relations in q, a project operator $\Pi_{A_1, \ldots, A_k}^e$ is safe in $\Pi_{A_1, \ldots, A_k}(q)$ if and only if, for every probabilistic relation, $R^p$, which is an element of probabilistic relation names occurring in q for said attributes, as denoted by $R^p \in$PRels(q), $A_1, \ldots, A_k$, a probabilistic event yielding head attributes, as indicated by $R^p.E \rightarrow$Head(q), can correctly be inferred from a set of induced functional dependencies on q, indicated by $\Gamma^p(q)$; and
       (A) if a safe extensional plan can be identified, employing the safe extensional plan to evaluate the query and determine the result that includes a correct probability for each potential answer within the data; and
       (B) if a safe extensional plan cannot be identified, selecting an alternative plan that will produce the result with an acceptable error in the probability for each potential answer within the data, and employing the alternative plan to produce the result; and
     (ii) providing the result to a user.

19. The system of claim 18, wherein the query includes a predicate associated with an uncertain match, to indicate that the result can have an approximate match to the predicate, further comprising the step of assigning a probability to each tuple in any table of the data that must be searched for an approximate match to the predicate in the query, the probability that is assigned indicating how well the tuple matches the predicate in the query.

20. The system of claim 18, wherein the processor executing the machine instructions stored in the memory further carries out the functions of:
   (a) sorting the answers to the query as a function of the probabilities of the answers; and
   (b) including at least a subset of the answers having the highest probabilities in the result provided to a user.

21. The system of claim 18, wherein the alternative plan includes one of:
   (a) a least unsafe plan that minimizes the error in computing the probabilities of the answers to the query; and
   (b) using a Monte-Carlo simulation for the alternative plan so as to guarantee a predefined arbitrarily low error in the probabilities of the answers to the query.

22. The system of claim 18, wherein the processor executing the machine instructions stored in the memory further carries out the functions of evaluating each operator included in the query to determine if the operator is safe, and if so, determining that an extensional plan is a safe extensional plan.

23. The system of claim 18, wherein the processor executing the machine instructions stored in the memory further carries out the functions of:
   (a) determining that a proposed extensional plan is a safe extensional plan if the proposed extensional plan does not employ any project operator; but if the proposed extensional plan includes a project operator, then,
   (b) attempting to apply all safe projection operations late in the query, before any projection operation that is not safe; and if it is not possible to perform any more projection operations that are safe for the query, then,
   (c) attempting to perform a join operation instead, by splitting the query into two queries, $q_1$ and $q_2$, which are joined, as indicated by $q_1 \bowtie_c q_2$, where the joining of the two queries is the last operation in the proposed plan, so that all attributes in c must be in the head attributes for the query, Head(q).

24. The system of claim 23, wherein the processor executing the machine instructions stored in the memory further carries out the functions of:
   (a) constructing a graph G having nodes that are relation names appearing in the query and having edges that are pairs, such that the query contains some join condition, $R_i.A=R_j.B$ with both $R_i.1.A$ and $R_j.B$ in the head attributes for the query, Head(q);
   (b) finding connected components of graph G;
   (c) choosing the two queries, $q_1$ and $q_2$, to be any partition of the connected components, thereby defining relation names appearing in each of the two queries, indicated as Rels($q_i$), and attributes of the two queries, indicated as Attr($q_i$), for i=1, 2;
   (d) defining the head attributes for the two queries, as Head($q_i$)=Head(q)∩Attr($q_i$), for i=1, 2;
   (e) wherein, if graph G is a connected graph, the query does not have any safe plan, while if graph G has multiple connected components; then,
   (f) employing a cost-based algorithm to determine how to split the query into the two queries in a most optimal manner; and
   (g) terminating the step of splitting the query when no more projection operations are needed, since any remaining operations for joining or selecting can be done in any order.

25. The system of claim 22, wherein for conjunctive queries q, q', if the query includes any union operator, any difference operator, or any group-by-aggregate operator:
   (a) a union operator, $\cup^e$, is safe in $q\cup^e q'$, if PRels(q) ∩PRels(q')=φ;

(b) a difference operator, $-^e$, is safe in $q \cap^e q'$, if $PRels(q) \cap PRels(q')=\phi$; and (c) a group-by-aggregate operator, $\gamma_{\overline{A},agg(B)}$ is safe in $\gamma_{\overline{A},agg(B)}(q)$, if $\Pi_{\overline{A}}(q)$ is safe, where agg is a minimum or a maximum.

26. The system of claim 18, wherein if an extensional semantics of a plan is known to equal probabilistic rankings of the data for the query, then the plan is a safe extensional plan.

27. The system of claim 18, wherein the query is formulated in structured query language (SQL).

* * * * *

UNITED STATES PATENT AND TRADEMARK OFFICE
CERTIFICATE OF CORRECTION

PATENT NO. : 7,363,299 B2
APPLICATION NO. : 11/281983
DATED : April 22, 2008
INVENTOR(S) : Dalvi et al.

It is certified that error appears in the above-identified patent and that said Letters Patent is hereby corrected as shown below:

| | |
|---|---|
| Column 1, line 13 | The paragraph entitled "Government Rights" should be replaced with the following --This invention was made with U.S. Government support under grant No. IIS-0140493 awarded by the National Science Foundation (NSF). The U.S. government has certain rights in the invention.-- |
| Column 8, line 44 | after "assumed" delete "that" |
| Column 11, line 52 | "$Pr(\wedge_{t \in}e_R(t)) \wedge (\wedge_{t \notin} \neg e_R(t))$" s/b --$Pr(\wedge_{t \in}e_R(t)) \wedge (\wedge_{t \notin} \neg e_R(t))$-- |
| Column 13, line 30 | "$q^i(D^p))$" s/b --$q^i(D^p)$-- |
| Column 14, line 12 | after "of" delete "(" |

Signed and Sealed this

Nineteenth Day of August, 2008

JON W. DUDAS
*Director of the United States Patent and Trademark Office*